United States Patent [19]
Ettlinger

[11] Patent Number: 4,746,994
[45] Date of Patent: May 24, 1988

[54] COMPUTER-BASED VIDEO EDITING SYSTEM

[75] Inventor: Adrian B. Ettlinger, Hastings-on-Hudson, N.Y.

[73] Assignees: Cinedco, California limited partnership; Ediflex, both of Burbank, Calif.

[21] Appl. No.: 768,491

[22] Filed: Aug. 22, 1985

[51] Int. Cl.⁴ ............................................. H04N 5/782
[52] U.S. Cl. .................................... 360/13; 360/14.1
[58] Field of Search ... 364/200 MS File, 900 MS File; 360/13, 14.1

[56] References Cited

U.S. PATENT DOCUMENTS

| | | | |
|---|---|---|---|
| 4,100,607 | 7/1978 | Skinner | 364/900 |
| 4,122,500 | 10/1978 | Bradford et al. | 360/13 |
| 4,249,218 | 2/1981 | Davis et al. | 360/13 |
| 4,272,790 | 6/1981 | Bates | 360/14.1 |
| 4,428,001 | 1/1984 | Yamamura et al. | 360/14.1 X |
| 4,491,879 | 1/1985 | Fine | 360/13 X |
| 4,528,600 | 7/1985 | Ishiguro et al. | 360/14.1 |
| 4,612,569 | 9/1986 | Ichinose | 360/14.1 X |

*Primary Examiner*—Thomas M. Heckler
*Attorney, Agent, or Firm*—Leonard Tachner

[57] ABSTRACT

A video-taped-based editing system comprising a computer-based operator's console having a light pen control monitor, floppy disk drives, video/audio switcher, color picture TV monitors with loud speakers and a Z80-based computer employing an STD bus. The system also comprises a plurality of video cassette player/recorders, preferably in the range of six to twelve of such player/recorders with associated computer/machine interface and an additional high quality master video player/recorder preferably of a ¾ inch format. The system provides a graphically arranged representation of the lined script of the work being edited on the light pen control monitor permitting the editor to preview and select segments of different takes for splicing with complete independence of picture and sound track sources and timing. The editing process is a dynamic one in which changes and adjustments are executed while watching repeated replays of a scene or segment. The system gives the editor the ability to work with a unit of material equivalent to approximately fifteen pages of script typing corresponding to one act of a television show or one reel of a theatrical feature film.

17 Claims, 25 Drawing Sheets

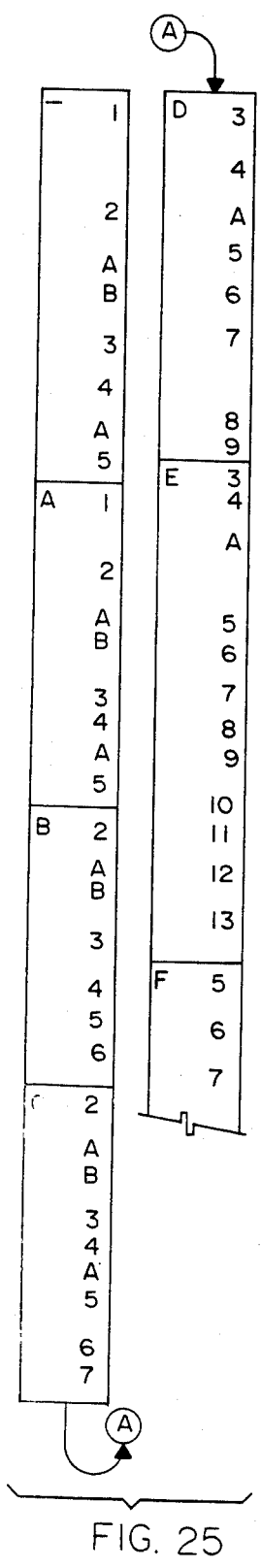
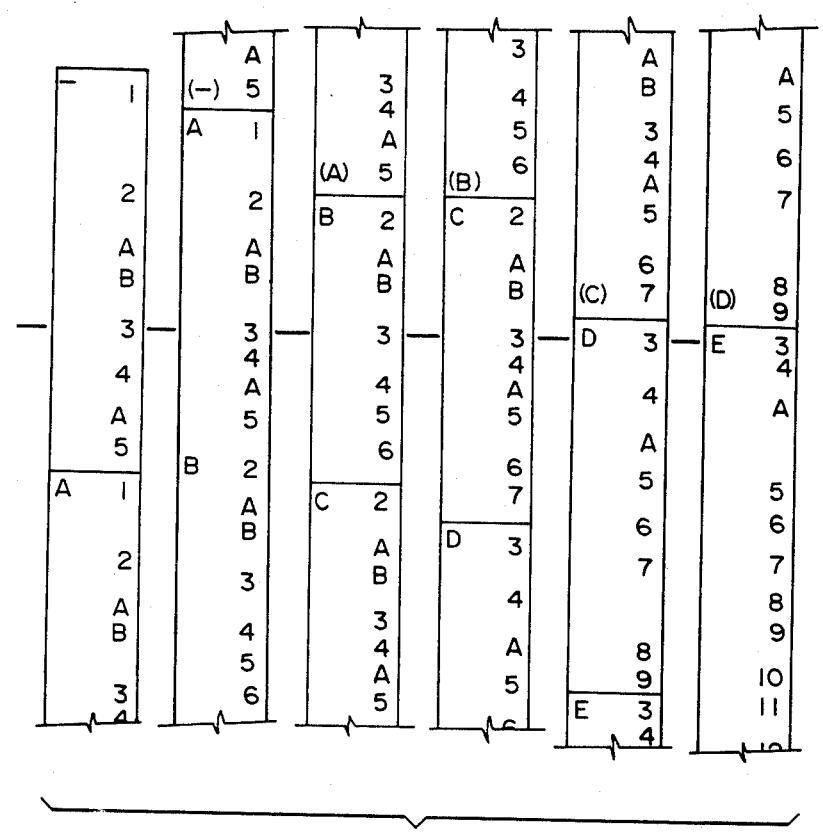
FIG. 25
FIG. 26

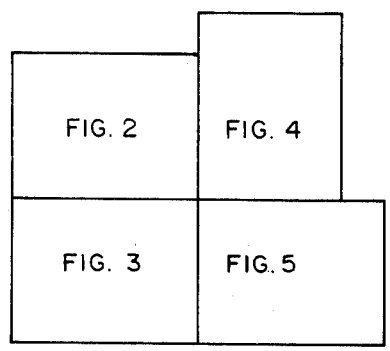
FIG. 27
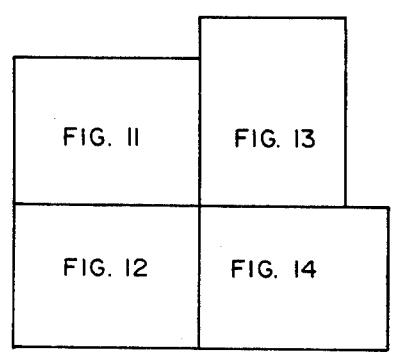
FIG. 29
FIG. 28
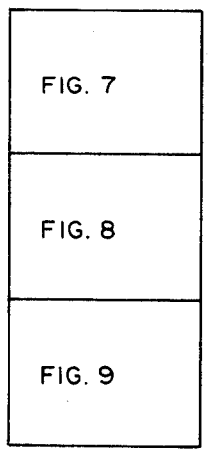

COMPUTER-BASED VIDEO EDITING SYSTEM

BACKGROUND OF THE INVENTION

1. Field of the Invention

This invention relates generally to editing media of visual art forms such as television shows and motion picture film and more particularly to a computer-based editing system for script-related editing that is significantly more efficient than conventional editing systems.

2. Prior Art

The principal function of the present invention is to provide means for practicing the art of "film" editing in a more efficient manner than the traditional "cut and paste" technique that has been in use since the turn of the century. The term "film" will be understood to embrace both traditional feature film works to be exhibited at least initially in motion picture theaters as well as television productions such as one-hour series films intended for prime-time television viewing.

It is well-known today that costs in the film production industry are escalating at a rapid pace and that the total elapsed time required to complete a production is an increasingly serious problem. Traditional film editing techniques constitute a significant time handicap and therefore contribute to both the cost and time problems of film production.

The present invention permits a "dynamic" form of film editing in which most editing decisions may be made while viewing the material being played at normal speed. A major advantage of editing with the present invention is that it facilitates a style of edit decision-making which permits low cost presentation of various versions of the work for comparison.

The only relevant prior art patent known to the applicant is U.S. Pat. No. 3,721,757 to Ettlinger, the inventor herein. Although there are a number of patentable differences between the present invention and that disclosed in the aforementioned Patent, one significant distinction pertains to the manner in which the material to be edited is correlated to a useable reference to which the user can readily refer. More specifically, in the present invention the work is correlated to a representation of the actual script on a line-by-line basis. The present invention utilizes a unique editing display which emulates a shooting script having separate "takes" identified and also having each line of script dialogue identified. This feature provides the user with a more practicaal editing tool which is also more efficient. No prior art computer-based editing system known to the applicant, provides such highly advantageous script correlation.

SUMMARY OF THE INVENTION

The computer-based editing system of the present invention comprises an operator's console having a light pen control monitor, floppy disk drives, video/audio switcher, color TV monitors and a Z80-based computer employing an STD bus. The system also comprises a plurality of video cassette tape machines each with an associated computer/machine interface and video monitor and an additional master video player/recorder. The editing system of the present invention provides a unique and highly advantageous graphic presentation of the lined script of the work being edited on the light pen control monitor. This particularly novel feature permits an editor to perform the editing function in much the same fashion to which he may have become accustomed using conventional prior art editing systems such as MOVIEOLA or a flat-bed.

More specifically, the present invention permits the editor to select segments of different takes for splicing with complete independence of picture and sound track sources and timing. However, the editing process using the invention is a dynamic one in which changes and adjustments are executed while watching repeated replays of a scene or segment. The invention gives the editor the unique ability in a computer-based system to work with a unit of material equivalent to approximately fifteen pages of script typing corresponding to one act of a television show or one reel of a theatrical feature film. The computer system controls the editing video player/recorders and a video/audio switcher to reproduce on the video picture monitor, which is the editor's principal focus of attention, the edited version of the scene.

A unique "Compose Script Mimic" process establishes reference points of correlation between a script and each "shot". A standard unit of correlation is a line of dialogue defined as any continuous string of words spoken by one character, bounded at each end by lines of dialogue spoken by other characters. Each such line of dialogue is assigned a number in consecutive order. Each video cassette player/recorder is loaded with an identical copy of the same material containing all shots needed to edit a particular scene. The shots are in consecutive order and comprise a tape copy of the "dailies" reel.

OBJECTS OF THE INVENTION

It is therefore a principal object of the present invention to provide a computer-based video editing system which emulates the conventional editing process but which provides for more efficient, faster and therefore less expensive editing.

It is an additional object of the present invention to provide a computer-based video editing system which correlates the material being edited with the script of the underlying work.

It is still an additional object of the present invention to provide a computer-based video editing system having a plurality of video cassette player/recorders (or disc players) each controlled by its own dedicated machine interface computer for substantially improving the efficiency of the editing process as compared to the prior art.

It is still an additional object of the present invention to provide a computer-based video editing system having means for automatically identifying prospective splice points based on the characteristics of the sound track associated with the work to be edited.

BRIEF DESCRIPTION OF THE DRAWINGS

The aforementioned objects and advantages of the present invention, as well as additional objects and advantages thereof, will be more fully understood hereinafter as a result of the detailed description of the invention taken in conjunction with the appended drawings in which:

FIGS. 25 and 26 are simplified representations of the recorded material as arranged for editing; and FIGS. 27 to 29 are diagrams used to explain how FIGS. 7 to 9, FIGS. 11 to 14 and FIGS. 13 to 16, respectively, should be combined.

DETAILED DESCRIPTION OF A PREFERRED EMBODIMENT

Figure 1:
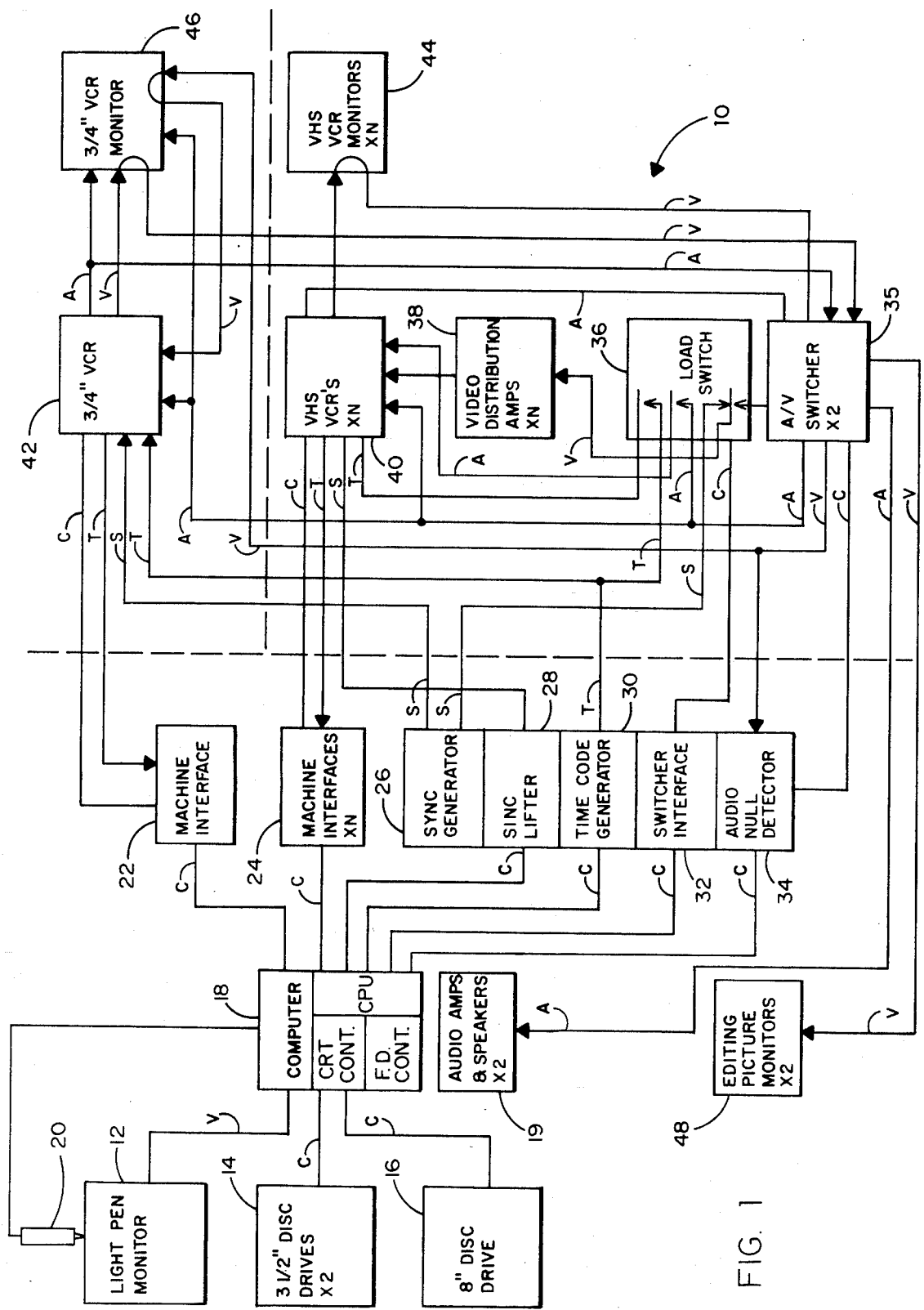
FIG. 1 is a simplified block diagram of the editing system of the present invention.
Figure 2:
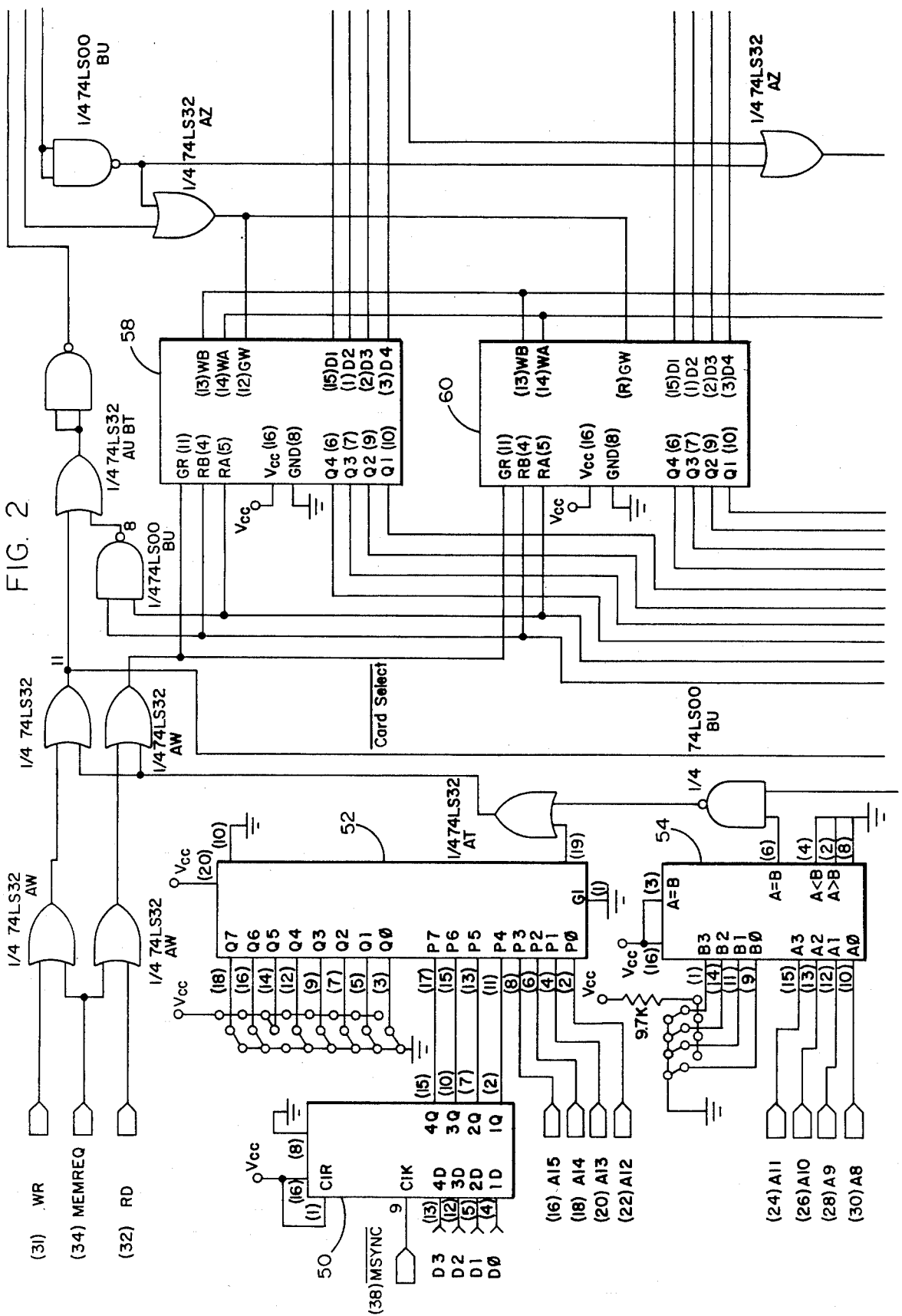
FIGS. 2 to 5 are contiguous parts of a schematic diagram of the machine interface portion of the invention.
Figure 3:
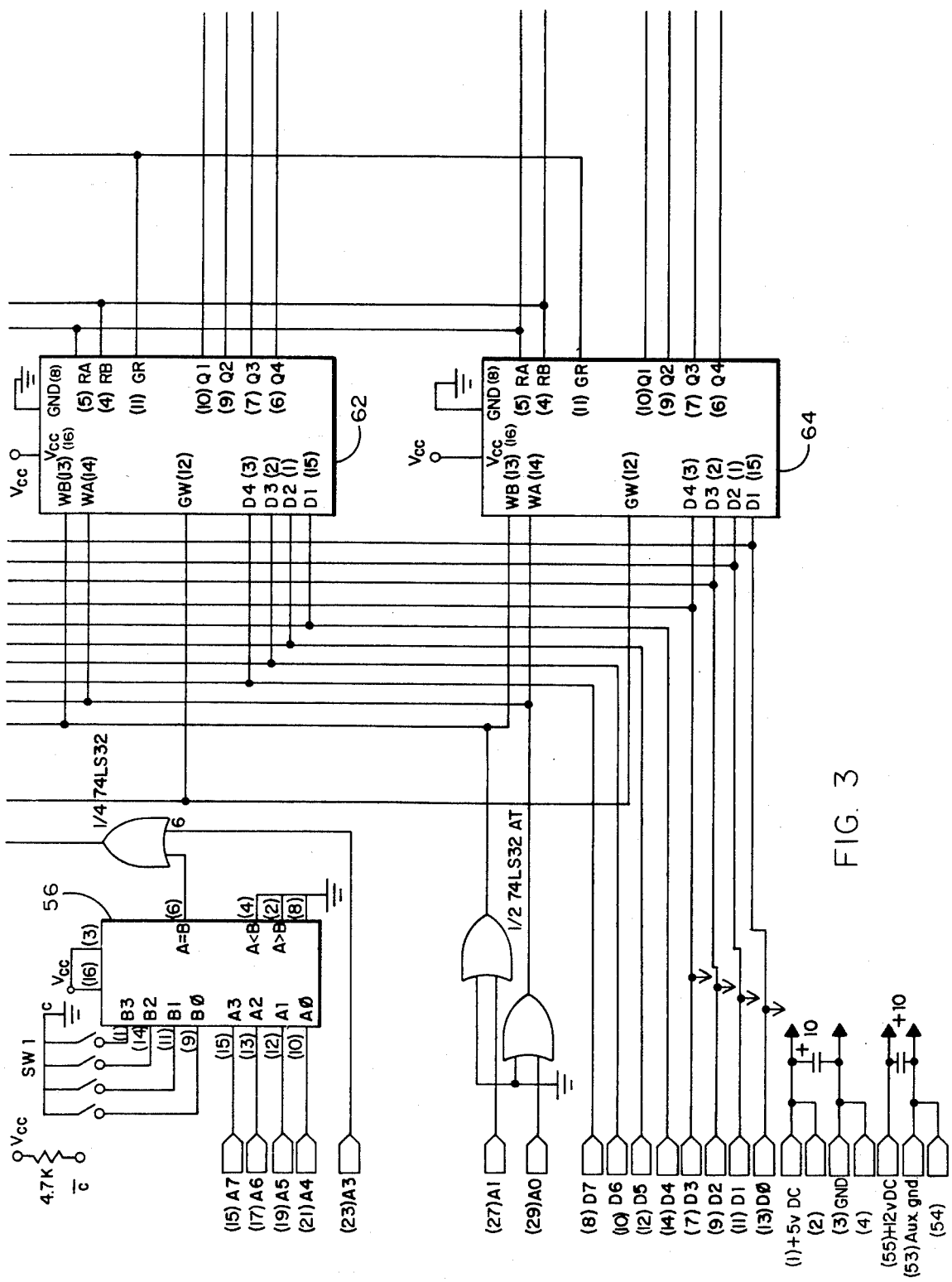

The editing system of the present invention is designed to permit film editors to perform all of the functions they require and to which they are accustomed.

The system consists physically of:

(1) An operator's console containing a light pen control monitor, computer, floppy disk drives, video/audio switcher, and two color picture monitors with loud speakers;

(2) VCR machine racks containing from 6–12 VHS recorder/player machines and associated monitors;

(3) A ¾ inch master VCR machine.

The editor operates the system by means of the light pen control monitor. His primary working display provides a graphically arranged reproduction of the lined script. Using this display and the light pen, the editor makes choices of picture and sound track sources as he records the splice decisions in the form of computer data through the scene being edited.

The editor has a variety of tools available to choose the selected material and he can preview and adjust each splice with complete independence of picture and sound track sources and timing.

The system also supports a variety of functions that are employed to both prepare material for the editor's use and to deliver the editor's cut of the show.

The preparation process includes the following steps:

(1) The film dailies are transferred and delivered on a time-coded ¾ inch video cassette;

(2) The dailies are transferred from the ¾ inch cassette to identical copies on each of the VHS machines. The system works most efficiently for the editor if the VHS copies have the material sorted out in script sequence. Therefore this is how the system is normally loaded;

(3) After the system is loaded, data files are prepared for the editor's script-oriented display. This operation provides various freedoms of choice as to location, length and designation for each column segment that represents one take of the dailies. The total time required for preparation is closely equivalent to the time normally taken by the assistant editor to prepare film material for an editor's use.

After the editor has completed the show or a portion of the show which he wishes to screen for the director or producer, a transfer is made of the edited version of the show to a ¾ inch cassette. This transfer is accomplished by computer control of the VHS machines and switcher to generate a replay of the show as edited. The complete show normally requires assembling sections from two or more loads of the VHS machines, and the software controls the recording process so as to join all sections together frame-accurately to create a print of the entire show.

Once the final cut of the show is approved, one of the two methods of delivery of the final edit decision list may be employed:

(1) If the show is to be delivered on video tape, the edit decision list is delivered in industry-standard format on a standard eight inch floppy disk;

(2) If the show is to be delivered on film, a negative cutting list keyed to edge numbers is provided, accompanied by a ¾ inch cassette of the final cut.

It is also possible to generate a kinescope recording with electronically imprinted readable edge numbers.

The invention gives the editor the ability, on a given load of the system, to work with a unit of material generally the equivalent of up to approximately 15 pages of script, usually one act of a television show or one reel of a theatrical feature film. With high shooting ratios, an act or reel might be divided into two loads. Loading a new unit of material takes approximately two minutes.

The editor can screen his cut version of the loaded material with minimal restrictions. The computer controls the VHS machines and the switcher to recreate the sequence of splices specified by the editor. The duration of run and number of splices that can be played in one continuous run is variable and dependent upon the frequency of the splices and the arrangement of the dailies material on the VHS cassettes. Experience has shown that it is not uncommon, with a minimal machine complement of six and a normal pattern of editing, for an entire act or reel of a show, running 10–12 minutes, to be capable of being played through non-stop. However, if editing is complex or there is a high shooting ratio for a given scene, a playback may be limited to a non-stop run of only a portion of the material, but never fewer splices than the number of machines in the system complement. The larger the number of machines provided in the system the greater is the capability of the system to permit non-stop runs despite very frequent splices and complexity of sequences. Additionally, when the playback is restricted, a continuing play overlapping the last part of the previous play can be activated conveniently with minimum waiting time.

The editor can quickly scan the available material to aid his choices. He can rapidly compare the available material for any given section of the script or line of dialogue.

In selecting a splice, the editor can play the picture and/or sound material at a variety of slow speeds in either direction, or jog in either direction one frame at a time.

In a given data file, six cut versions of the sequence can be stored. By saving on floppy disk files, an unlimited number of versions can be retained. Splice data files are saved during the process. Portions of splices from different cut versions can be combined as desired to create a new cut version. Data files can be rearranged to change the order of scenes within a show.

SYSTEM HARDWARE

The computer hardware configuration is based on the STD bus. The main or host processor is a Z80. The memory system uses a 64K address range, which includes partitions for a memory-mapped CRT controller, a small peripheral driver firmware package in EPROM, and memory-mapped addressing of machine interface peripheral processors. The machine interfaces are based on the 8085 microprocessor family and include integral time code reading. A circuit similar to the machine interface design serves as a time code generator and smart controller for miscellaneous peripherals, including the switcher.

Reference will now be made to FIG. 1 which indicates in general form the major components of the present invention. More specifically, referring now to FIG. 1 it will be seen that the editing system 10 of the present invention comprises a light pen monitor 12, a pair of 3½ inch floppy disk drives 14, an 8 inch floppy disk drive 16, a computer 18, a light pen 20, a machine interface 22 which is adapted to interface with a ¾ inch video cassette recorder (VCR) and a plurality of machine interfaces 24, each of which is adapted to interface with the VHS video cassette player/recorders. The editing system 10 also comprises a synchronization generator 26, a synchronization lifter 28, a time code generator 30, a switcher interface 32, an audio null detector 34, a pair of audio/video switchers 35, a load switch 36, a plurality of distribution amplifiers 38, a plurality of video cassette player/recorders 40, a unitary ¾ inch video cassette recorder 42, a plurality of video editing monitors 44, a monitor 46 and a pair of editing picture monitors 48.

Light pen monitor 12 may by way of example, be a Ball Electronic Systems Model CD-120 black and white monitor. The 3½ inch disk drives 14 may by way of example, be a Sony Model OA-D33Y disk drive. The 8 inch disk drives 16 may be a Tandon Corporation Model TM848-1 disk drive. Computer 18 comprises by way of example, a Mostek CPU-3 CPU card, a Prolog 7388 floppy disk controller, an ISI Model 3430 CRT controller and an Information Controls light pen 20 type LP-710. The audio amplifiers and speakers 19 may by way of example, comprise a Fostex Corporation Model 6301 speakers with corresponding amplifier. The machine interface 22, machine interfaces 24, sychronization generator 26, synchronization lifter 28, time code generator 30, switcher interface 32, audio null detector 34 and load switch 36, are all specially designed and unique to the present invention and are described hereinafter in conjunction with FIGS. 2 to 18 which illustrate the schematic representations of these components of the system 10.

The audio/video switchers 35 may, by way of example, comprise Omicron Video Corporation switcher Model 533-15/2. The video distribution amplifiers 38 may, by way of example, comprise Omicron Video Corporation Model 210 distribution amplifiers. The VHS video cassette recorders 40 may, by way of example, comprise Japan Victor Corporation Model BR-6400U VHS machines. The ¾ inch video cassette recorder 42 may, by way of example, comprise a Japan Victor Corporation Model CR-8250 ¾ inch video machine. The VHS video cassette monitors 44 may by way of example, comprise a Sony Corporation Model PVM-411 monitor rack. The video monitor 46 may, by way of example, comprise a Panasonic Model BTS-1900N color monitor. The editing picture monitors 48 may, by way of example, comprise a Panasonic Model BT-1300SN video monitor.

FIG. 1 not only provides a block diagram of the major components of the present invention and their relative interconnections, but also provides an indication of the nature of signals that are transferred between such components. More specifically, it will be noted that all of the interconnection lines between the various components in FIG. 1 are labelled by the letters "C, V, A, S or T". These letters indicate the nature of the signals. The "C" represents control signals, "V" represents video signals, "A" represents audio signals, "S" represents synchronization signals and "T" represents time code signals. The specific nature of these signals, as well as the specific operation and interface of the components of FIG. 1, particularly those that are unique to the present invention, will be described hereinafter below in conjunctions with FIGS. 2 to 18.

Reference will now be made to FIGS. 2-5 which when assembled in accordance with FIG. 27 together comprise a schematic diagram of machine interfaces 22 and 24 of FIG. 1. The machine interfaces 22 and 24 each comprise a computer interface system which in effect interfaces the host computer 18 with each of the video cassette recorders 40 and 42. Each such machine interface comprises the circuit illustrated in the composite of FIGS. 2, 3, 4 and 5 and each is adapted to interface with the host computer 18 by means of an STD bus. Furthermore, each provides its own microprocessor for controlling the transfer of command and tally signals between the video cassette recorder and the host computer. More specifically, as seen best in FIGS. 2 and 3, which comprise the left-most portion of the machine interface schematic diagram, the data and address lines from the STD bus connected to the host computer 18 are connected in turn in the machine interface circuit to a plurality of integrated circuit chips. These include circuit chip 50, which is a quad flip-flop such as a 74LS175, circuit chip 52 which is an eight bit magnitude comparator such as a 74LS688 and a pair of 4 bit magnitude comparators 54 and 56, which may, by way of example, each be a model 74LS85 integrated circuit chip.

Circuit chip 50 provides a latching function while chips 52, 54 and 56 provide an address decoding function. More specifically, comparators 52, 54 and 56 have one set of inputs connected to a plurality of switches, each of which is connected to either +5 volts or 0 volts DC depending upon the selected address code for a particular machine interface. When the incoming signals from the host computer 18 are assembled from the appropriate selected binary code for a particular machine interface 40 thereby matching the selected switch positions, the output of the comparators attain the proper logic value indicating that that particular machine interface has been selected. These comparator output signals indicating that the proper address code has been received for the particular machine interface selected, are channeled through a sequence of appropriate gates and applied as enable inputs to four 4×4 register files with tri-state outputs comprising chips 58, 60, 62 and 64, respectively Each such chip 58-64, in effect, contains four words of four bits each of memory which can be independently read from or written into. Chips 58 and 60 provide therefore an 32-bit path for data communications between the machine interface circuit and the host computer 18 while chips 62 and 64 provide an 32-bit path for communication from the host computer to the machine interface circuit. It is believed that this complement of 4-bit memory buffers is a novel method of communication in an editing system between a host computer and a plurality of machine interface systems for controlling a respective plurality of video player/recorders.

This form of communications compares very favorably to other forms of microprocessor-to-microprocessor communications because of a significant increase in the speed with which data can be transferred between the two microprocessors. This increased speed is particularly advantageous in the present system where a plurality of video cassette recorders are being controlled simultaneously in order to permit dynamic video editing with little or no delay that can be discerned by the editor in selecting various segments of different takes to edit into the final work.

Figure 4:
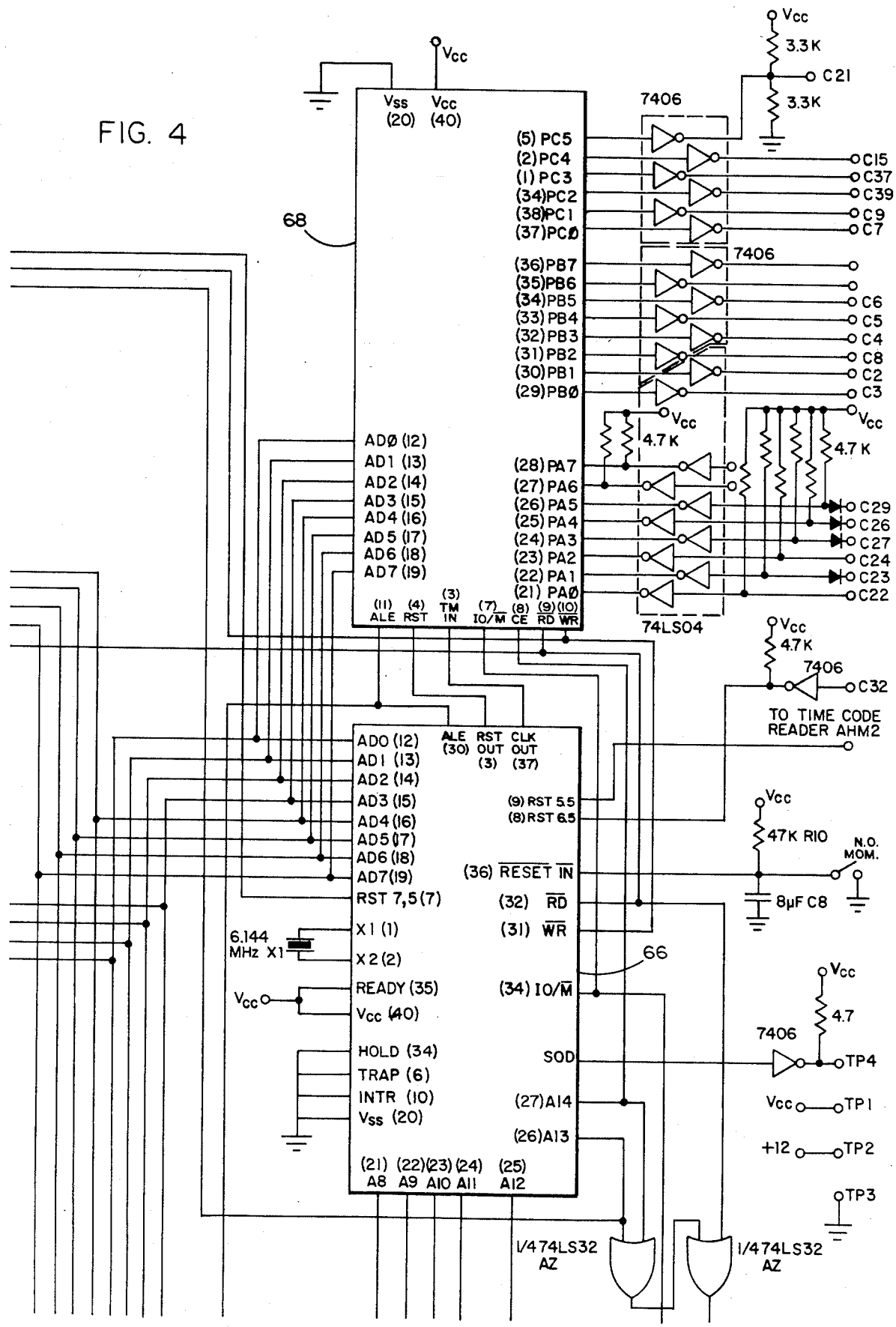
Figure 5:
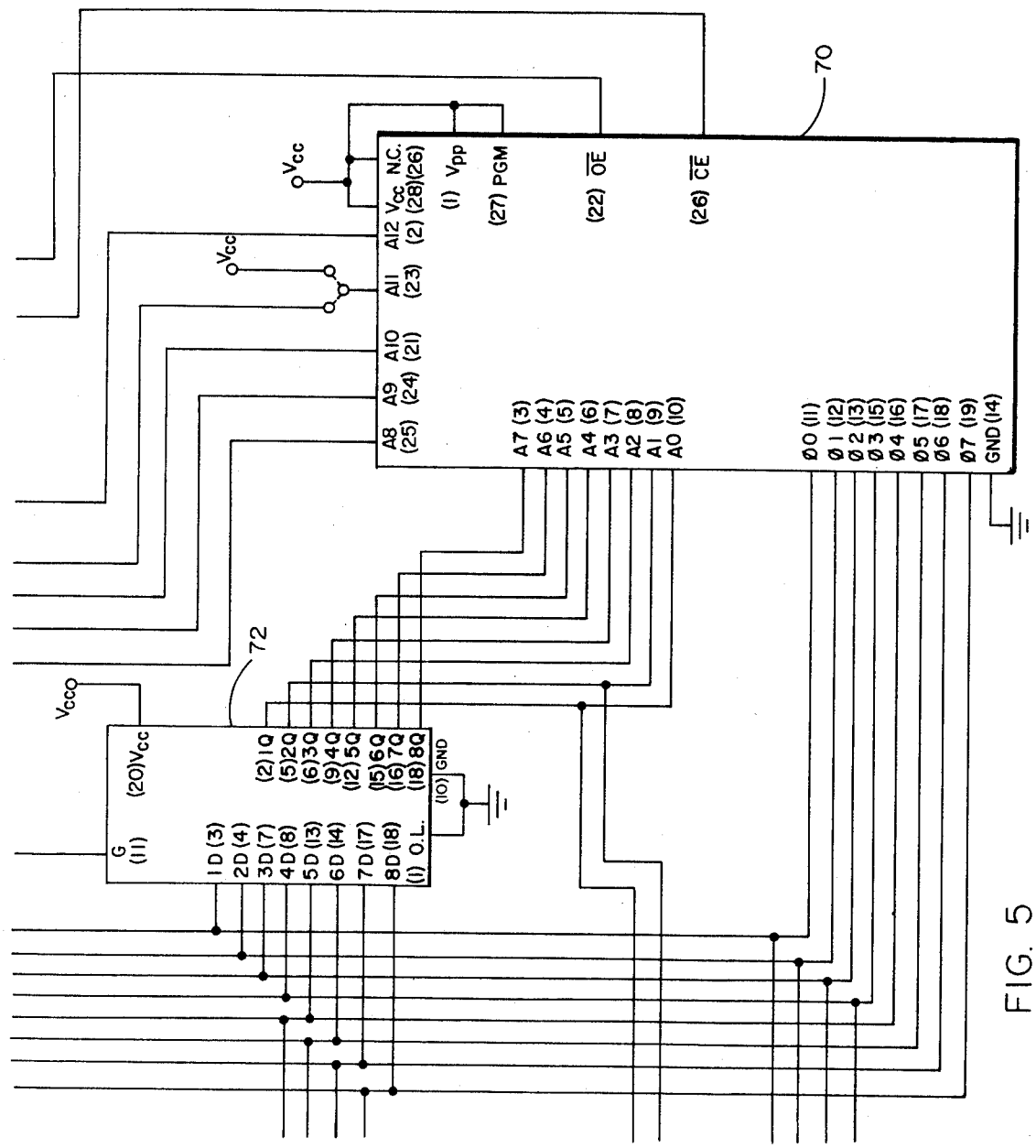

The output signals of the register files comprising chips 58, 60, 62 and 64 are connected to a microprocessor assembly, in this particular instance, comprising a Model 8085 microprocessor CPU and attendant peripheral units shown in FIGS. 4 and 5 as chips 60, 68, 70 and 72. More specifically, chip 68 comprises a Model 8085 microprocessor CPU and the remaining chips provide the assortment of typical peripheral devices associated with that CPU. By way of example, chip 68 comprises a Model 8156 integrated circuit which provides 256 bytes of RAM memory, a timer and 22 parallel input-/output lines which are used for direct interface with the video cassette recorders. Chip 70 comprises a Model 2764 erasable PROM having 64K of memory and chip 72 comprises an octal D-type latch such as a Model 74LS373 integrated circuit chip which is used to latch the address signals into the EPROM 70.

As previously indicated, the principal interface between the machine interface circuit of FIGS. 2, 3, 4 and 5 and a corresponding video player/recorder to which the machine interface is dedicated, is provided at the right-most portion of chip 68 as seen in FIG. 4. More specifically, output terminals labelled PB0 through PB7 and PC0 through PC5 applied through a plurality of Model 7406 open collector buffer drivers, output signals to the video player/recorder being controlled by the machine interface circuit for applying command signals such as PLAY, FAST FORWARD, REVERSE, and the like. Similarly, the lines labelled PA0 through PA7, which are similarly connected to a buffer circuit in the particular example comprising a Model 74LS04 open collector buffer driver chip, receives signals from the video player/recorder as a form of "tally back" from the video cassette recorder confirming that the video player/recorder has received the signals output from the chip 68 and has responded appropriately by indicating the condition of the transport of the video player/recorder.

The timing of the signal transfer between the machine interface and the video player/recorder being controlled thereby, which timing is needed to permit the machine interface to keep track of the approximate frame position of the video tape of the player/recorder controlled thereby, is dictated by a time code reader which will be discussed hereinafter and which generates a time code signal applied to the RST5.5 interrupt input of the 8085 CPU chip 66. This is a SMPTE serial time code standardized by the Society of Motion Picture and TV Engineers, but modified in the machine interface circuits of machine interfaces 24 of FIG. 1 to utilize a binary coding process which precludes the necessity of otherwise converting binary coded decimal into binary signals. Thus it will be seen that each machine interface circuit of machine interfaces 24 or 22 of FIG. 1 provides a novel means for controlling the precise position of each of the video player/recorders with which the present system operates, including a plurality of editing recorders 40 of FIG. 1 as well as the ¾ inch video cassette recorder 42 whereby to permit the host computer 18 to optimize positioning of respective tapes and, therefore, of the respective takes of each of the available video information for editing purposes.

As previously indicated, those machine interface circuits which connect to the VCRs 40, convert the BCD or binary coded decimal format of the SMPTE timing code to a binary format in order to speed up the machine interface/video cassette recorder protocol. This conversion is carried out by means of the time code reader circuit of FIG. 6 which comprises a comparator 75 such as an LM311 comparator, a dual one-shot multivibrator 76 such as an LM556 multivibrator and a combiner OR gate circuit 78, the output of which is the RST5.5 interrupt signal which is applied to the 8085 CPU chip 66 as a low level interrupt signal. More specifically, the conventional time code generator signal is applied at pin J1 of FIG. 6 and eventually to one input of comparator 75, the other input to which is determined by the voltage divider consisting of resistors 79 and 80. The function of comparator 75 is to, in effect, signal condition the time code signal input to provide well-shaped 0–5 volt transitions of the time code pulses.

Figure 6:
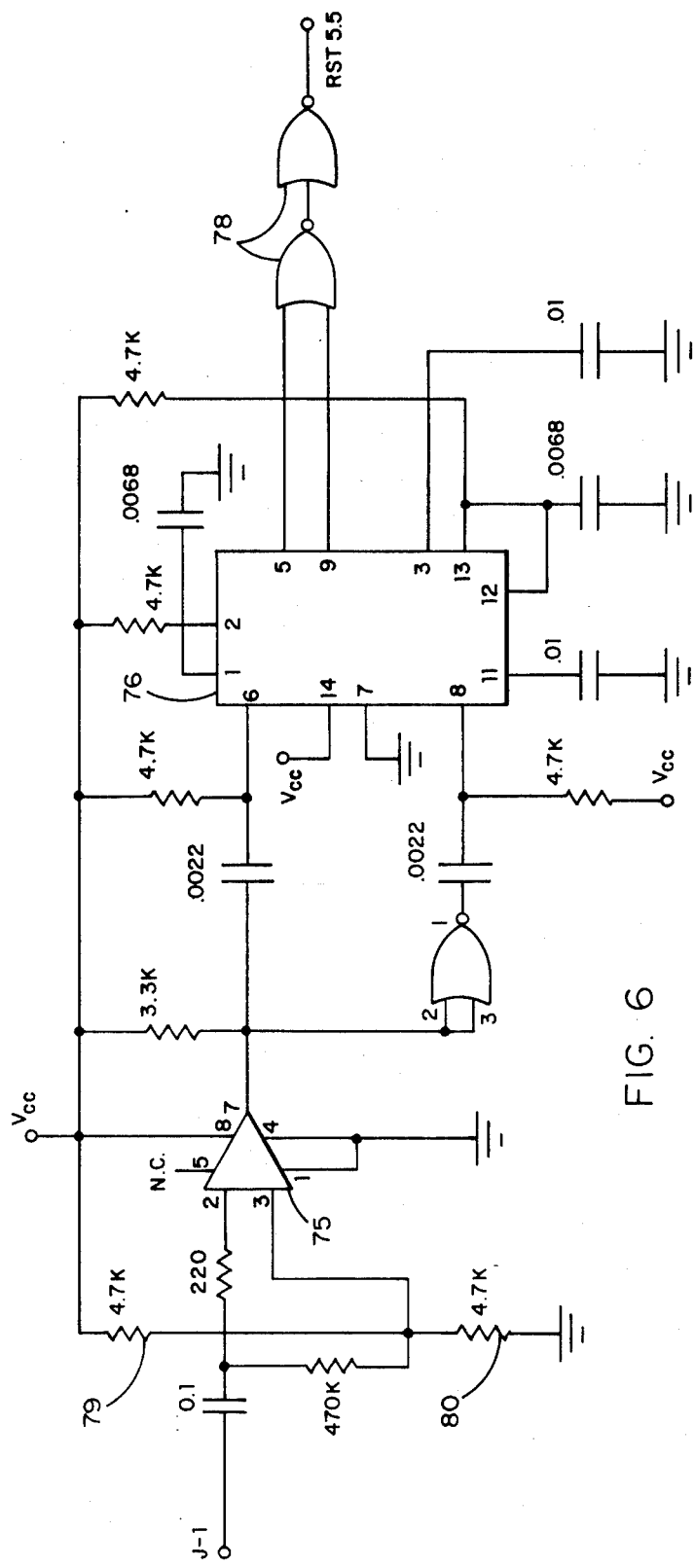
FIG. 6 is a portion of the time code reader circuit of the invention.

The output of comparators 75 is supplied both as an inverted signal and an uninverted signal to the trigger inputs of dual one-shot multivibrator 76 and the outputs are connected to the combiner OR gate circuit 78. The function of the time code reader circuit of FIG. 6 is to convert the BCD format of the time code signal by responding to each positive or negative going transition to generate a 40 microsecond long positive pulse in response to each such transition. It is this series of unipolar pulses which is applied to the RST5.5 input of the 8085 CPU of the machine interface circuit.

At this point it is to be noted that the RST6.5 interrupt signal, that is, the signal which is applied to the RST6.5 input of the 8085 CPU chip of FIG. 4, is a signal which is derived from the tape machine as a series of control track pulses for rough tracking of the video tape during all non-play speeds, that is, FAST FORWARD, REVERSE, and multiples or submultiples of those tape transport speeds. On the other hand, the RST5.5 signal derived from the time code reader circuit of FIG. 6 is a more accurate frame-by-frame time code signal which enables the machine interface to keep accurate track of the actual frame position of the video tape of each transport. The use of two distinct timing signal sources, one more accurate for the play speeds and a second less accurate, but still within a few frames of actual tracking, for the non-play speeds, permits accurate tracking of the video tape with a significant reduction in the total amount of hardware required were it otherwise necessary to keep track of the time code signal for all possible tape speeds.

Figure 7:
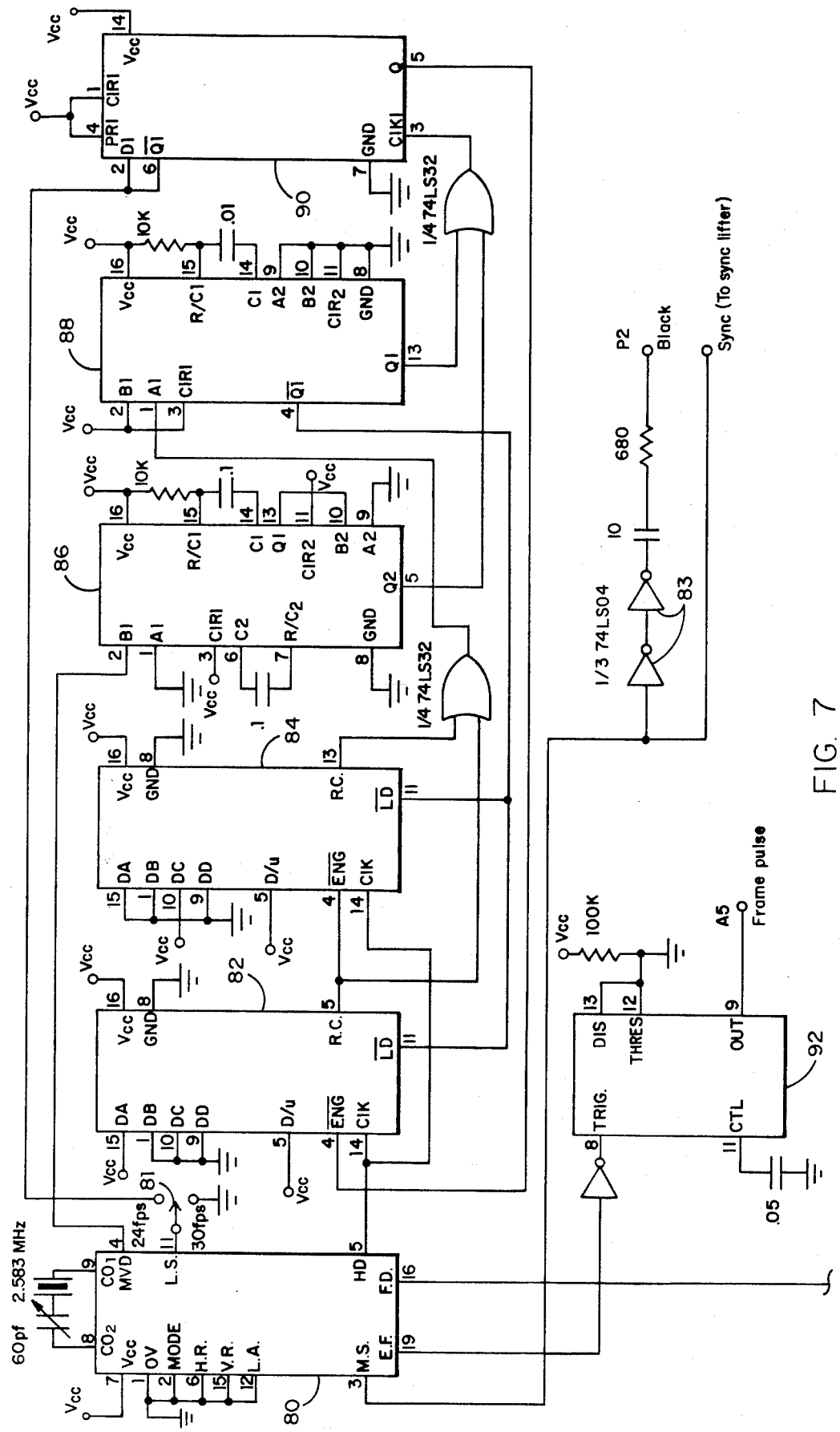
FIGS. 7 to 9 are contiguous parts of a schematic diagram of the sync generator portion of the invention.
Figure 8:
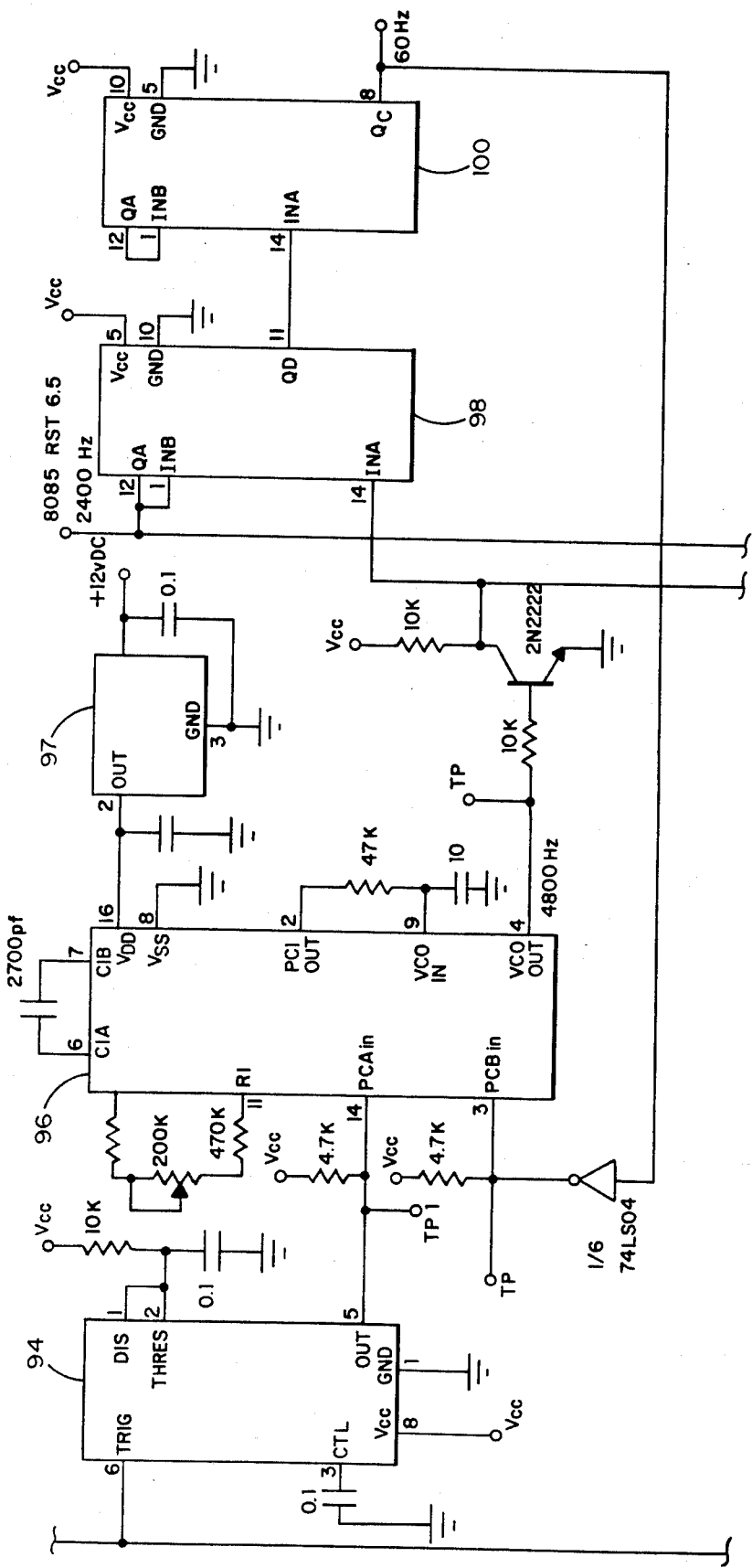
Figure 9:
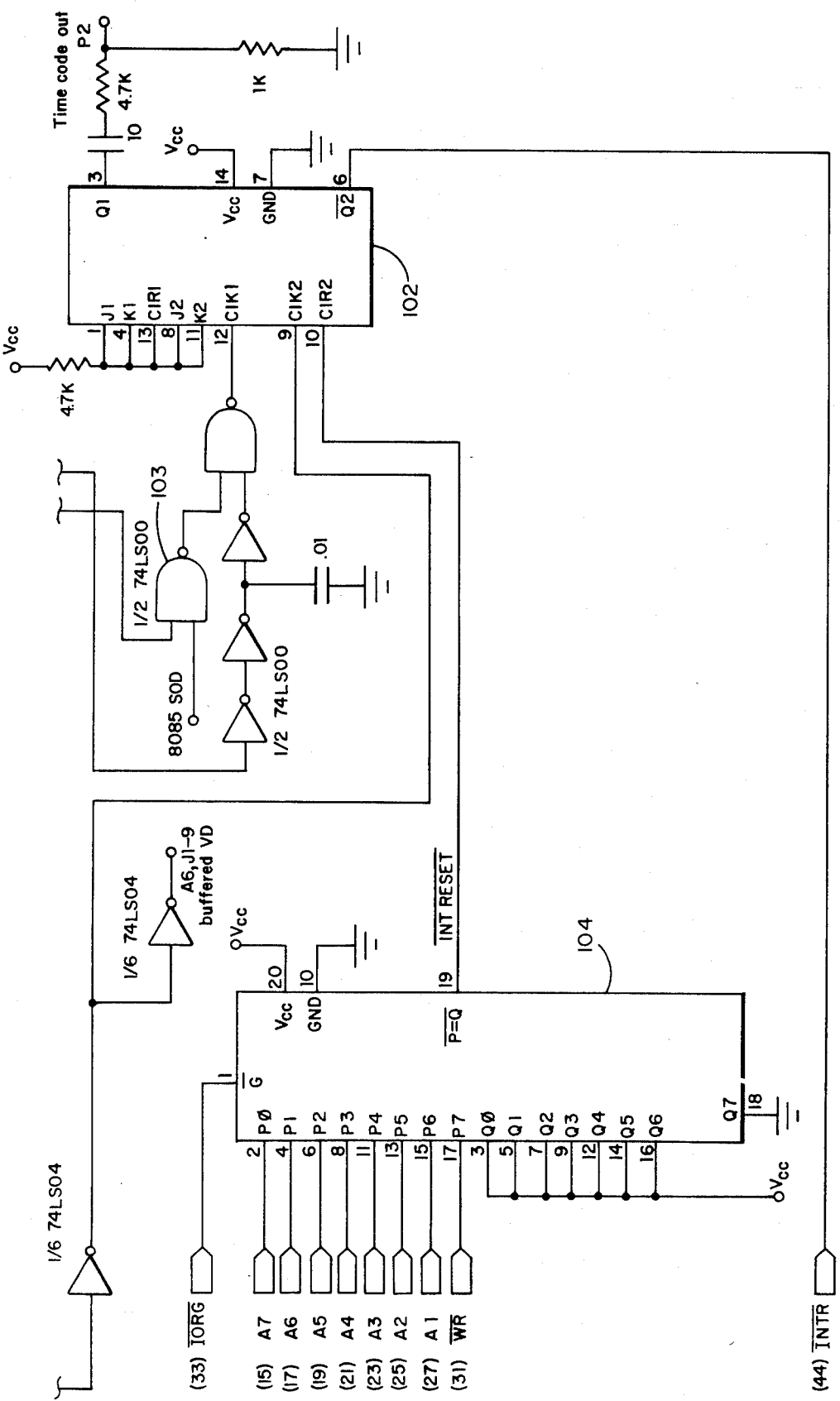

Reference will now be made to FIGS. 7, 8 and 9 taken together in the configuration illustrated in FIG. 28 and comprising the time code generator and sync generator 30 and 26, respectively of FIG. 1. Referring first to FIG. 7 it will be seen that the sync generator portion of the present invention comprises chips 80, 82, 84, 86, 88, 90 and 92 which are respectively a TV camera sync generator, such as Model ZNA134 manufactured by Ferranti Electric; a pair of BCD/binary up/down counters such as Model 74LS191; a monostable multivibrator such as Model 74LS123; dual multivibrator such as Model 74LS221; and a flip-flop such as a Model 74LS74.

The heart of the sync generator is the chip 80 which provides a synchronization output at the MS terminal and which is applied to a pair of buffer inverters 83 as the black reference video signal to the video player/recorders. It is also applied to the sync lifter, the function and details of which will be described hereinafter. Chip 80 provides its own counter so that its output is based upon a 2.583 MHz clock and provides the basic 30 frame per second, 525 line sync signal that is standard for TV format in the United States. However, a second series of external counters is provided consisting of chips 82, 84, 86, 88 and 90 which respond to the positioning of switch 81 connected to the LS or line sync terminal of chip 80 to force the TV camera sync generator of chip 80 to, instead, generate a 24 frame per second signal. This is an alternative sync signal for processing film material directly where 24 frames per second at 655 lines is a de-facto industry standard.

As those having skill in the art to which the present invention pertains will understand, the standard video system utilizes a 60 field, 30 frame per second synchronization signal for the video format. Thus, in order to assure phase synchronization, as well as frame synchronization, it is necessary to generate a frame pulse for identifying even and odd frames. This is accomplished by means of the EF output of chip 80 which is applied to a monostable multivibrator, such as ½ of a Model LM566 integrated circuit chip 92, the output signal of which constitutes the aforementioned frame pulse. Another output of the TV camera sync generator chip 80, namely the FD output, is applied to the other half of the LM556 dual multivibrator chip 94 shown in FIG. 8. Also included in FIG. 8 is a phase lock loop chip 96 which may for example be a Model CD4046 phase lock loop, a voltage regulator 97 and a pair of binary counters 98 and 100 which by way of example may be a Model 74LS90 and Model 74LS93 binary counters, respectively.

The function of the circuit of FIG. 8, controlled by the output of TV camera sync generator chip 80, is to provide a stable phase locked pair of signals at 2400 Hz. and 60 Hz., respectively, which are applied to the RST6.5 interrupt input and SID input of the Model 8085 CPU of the time code generator microprocessor circuit which will be described hereinafter. The purpose of applying these signals to the time code processor is to generate the SMPTE time code previously mentioned and which is reinserted into the time code generator portion of FIG. 9 as the 8085 SOD input which is applied through NAND gate 103 and other associated logic as one input into the dual flip-flop chip 102 which may, by way of example, be a Model 74LS107. The Q1 output of chip 102 is the time code output which is applied throughout the system as previously described in conjunction with FIG. 1, namely, the lines identified in that figure with T and which are applied to the VCRs either directly as in the case of the ¾ inch VCR 42 of FIG. 1, or indirectly to the VCRs 40 by means of the load switch 36 of FIG. 1.

FIG. 9 also provides an interrupt response function whereby the host computer 18 of FIG. 1, is in effect, synchronized to the sync generator portion of the system. More specifically, chip 104 comprises an 8-bit comparator to which address signals of the STD bus connected to the host computer are applied, so that when the proper selection of STD bus address signals is applied to the chip 104, which may by way of example be a Model 74LS688, the interrupt is reset through dual flip-flop chip 102, the Q2 output of which is the interrupt signal which is transmitted to the host computer by means of the STD bus. Accordingly, the host computer is, in effect, tied by means of interrupt signals to the sync generator output to allow the host computer processor to keep time and synchronization with the sync generator.

Figure 10:
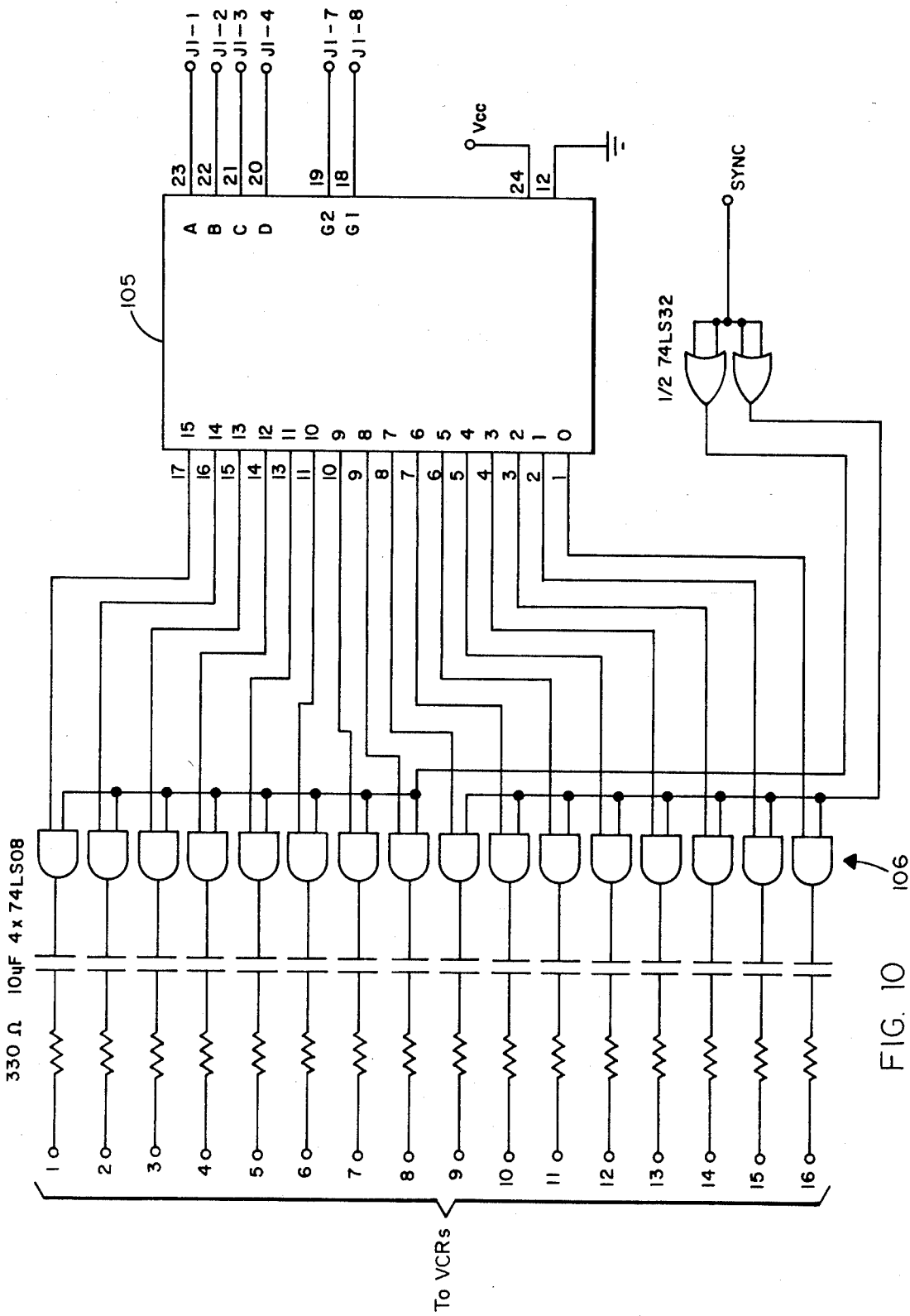
FIG. 10 is a schematic diagram of the sync lifter portion of the invention.
Figure 11:
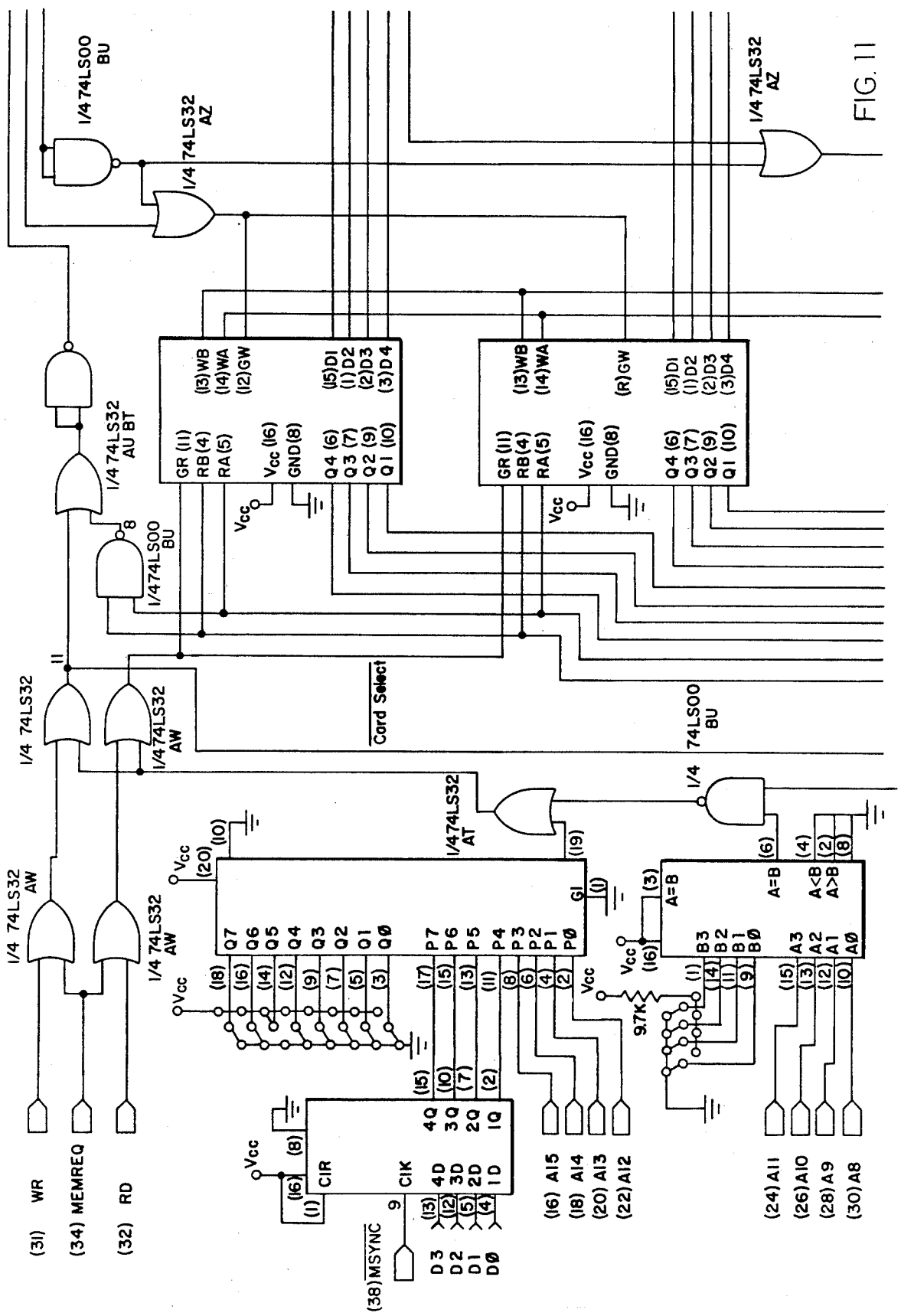
FIGS. 11 to 14 are contiguous parts of a schematic diagram of the time code generator portion of the invention.
Figure 12:
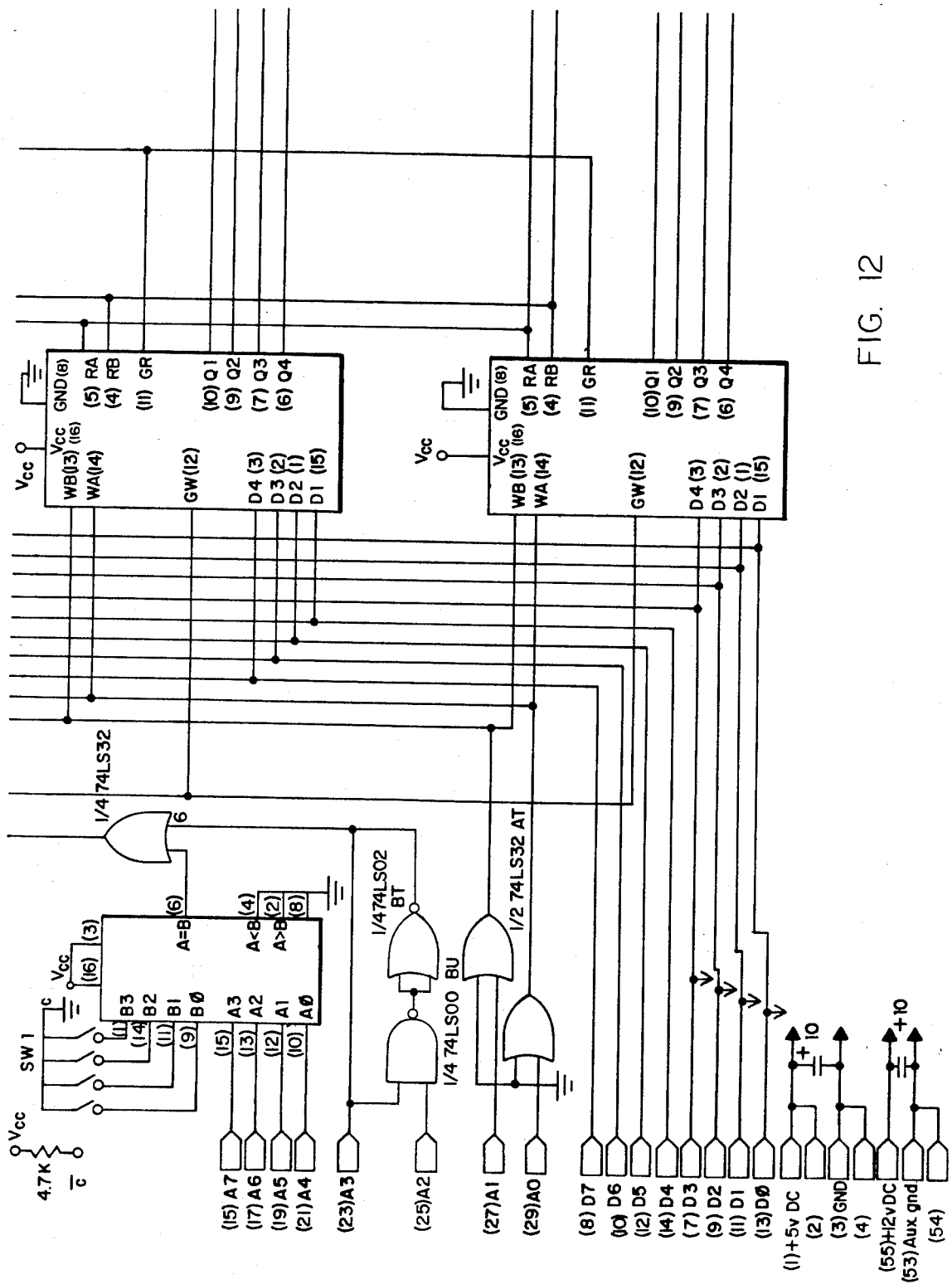

Reference will now be made to FIG. 10 which is a schematic diagram of the sync lifter of the present invention. Those having skill in the art to which the present invention pertains will understand that some video cassette recorders do not have the proper circuits to force even/odd field synchronization when the machine is first turned on. Such field synchronization can be accomplished manually using a manual switch normally provided on the VCRs by throwing such switch to a selected position and monitoring the frame phase status on an oscilloscope or the like. However, the sync lifter circuit of FIG. 10 is provided in order to obviate such a manual process and thereby avoid the inconvenience of requiring the user of the editing system of the present invention to spend time performing such a manual process. The sync lifter circuit of FIG. 10 takes advantage of the characteristic of VCRs in that when the synchronization signal to a VCR is temporarily lifted, the VCR will drift through phase slowly, and will lock onto the desired phase when the synchronization signal is restored.

Thus, the object of the circuit of FIG. 10 is to sequentially and automatically lift the sync temporarily from each VCR for a brief period of time so that the plurality of VCRs 40 of FIG. 1 can, in effect, be forced into frame phase synchronization to assure proper and accurate editing control of all VCRs. This function is accomplished by means of a 4-byte input, 16-byte output decoder chip 105 which may for example be a Model 74LS154. The 16 output signals are fed to a group of 16 AND gates 106 which may for example comprise four Model 74LS08 integrated circuit chips. Also fed to these AND gates as a second input, is a derivative of the sync signal generated by the sync generator of FIGS. 7, 8 and 9. The input signals to the decoder 105 are sequentially selected by the software of the present invention to momentarily provide a zero output on each one of the 16 lines feeding the 16 AND gates 106, whereby the synchronization signal is lifted or blocked from each such line for a selected period of time in sequential order. The sync signal is thus momentarily lifted from each of the video cassette recorders 40 of FIG. 1, allowing each to attain proper phase synchronization as previously described.

Reference will now be made to FIGS. 11 through 14 which illustrate the microprocessor circuit portion of the time code generator 30 of FIG. 1. It will be recognized that the circuit of FIGS. 11 through 14 combined in accordance with FIG. 29, is very similar to the machine interface circuit of FIGS. 2, 3, 4 and 5 combined in accordance with FIG. 27. Accordingly, only the differences will now be discussed. One of the differences between the two circuits resides in the integrated circuit elements on the left-most portion of FIGS. 11 and 12 where the particular code set up for the address decoders are unique to the time code generator microprocessor circuit. Furthermore, since there is only one such circuit in the present system as compared to a plurality of machine interface circuits of analogous address decoders, the level of switching provided in the machine interface microprocessor circuits is not required in this unitary time code generator microprocessor circuit.

The principal distinguishing features between the two circuits reside in the signals that are input and output relative to the parallel ports of the 8156 RAM chip, as well as some of the particular signals input to and output from the 8085 microprocessor chip. More specifically, as seen primarily in FIG. 13, the RAM chip instead of interfacing with a video cassette recorder as was the case of the RAM chip of FIG. 4, is adapted to interface with the sync lifter 28, time code generator 30, switcher interface 32, audio null detector 34, load switch 36 and A/V switchers 35 of FIG. 1.

As in the case of FIG. 4, the RAM chip is provided with three I/O ports, namely, PORTS A, B and C each having eight lines. The lines of PORT A are input lines to the RAM chip and the lines of PORTS B and C are output lines. PORT A inputs include an audio null detector signal which will be discussed hereinafter in conjunction with FIG. 15, as well as a frame pulse signal and 60 Hz. field rate pulse which are both generated from the circuit of FIGS. 7, 8 and 9 previously discussed. In addition, PORT A and in particular pin 7, is adapted to receive a light pen switch signal also known as a tip switch indication which is generated each time the light pen is depressed, whether or not on the light pen CRT monitor. The purpose of this tip switch operation by the editor will be described hereinafter.

One of the key similarities between the time code generator microprocessor circuit and the machine interface microprocessor circuit, is the use of the memory mapping communication concept previously described in conjunction with FIGS. 2, 3, 4 and 5. This circuit also utilizes a pair of 4×4 register files for transfer of information from the time code generator microprocessor circuit to the host computer and a similar pair of 4×4 register files for data transfer from the host computer on the STD bus into the microprocessor portion of the time code generator circuit. These model 74LS670 integrated circuit chips operate in precisely the same manner as previously described with regard to FIGS. 2, 3, 4 and 5. Accordingly, it will be understood that the various signals input to the RAM chip of FIG. 13, including the audio null signal, the frame pulse, the field rate pulse and the light pen tip switch signal, are memory mapped into the upper pair of 4×4 register files for transfer to the host computer 18 of FIG. 1 over the STD bus. These signals, which are sampled sixty times a second, are therefore always available within the 4×4 register files, thereby providing the advantageous high speed transfer of data between the host computer and the internal circuit computers, in this case, the microprocessor for the time code generator.

Figure 13:
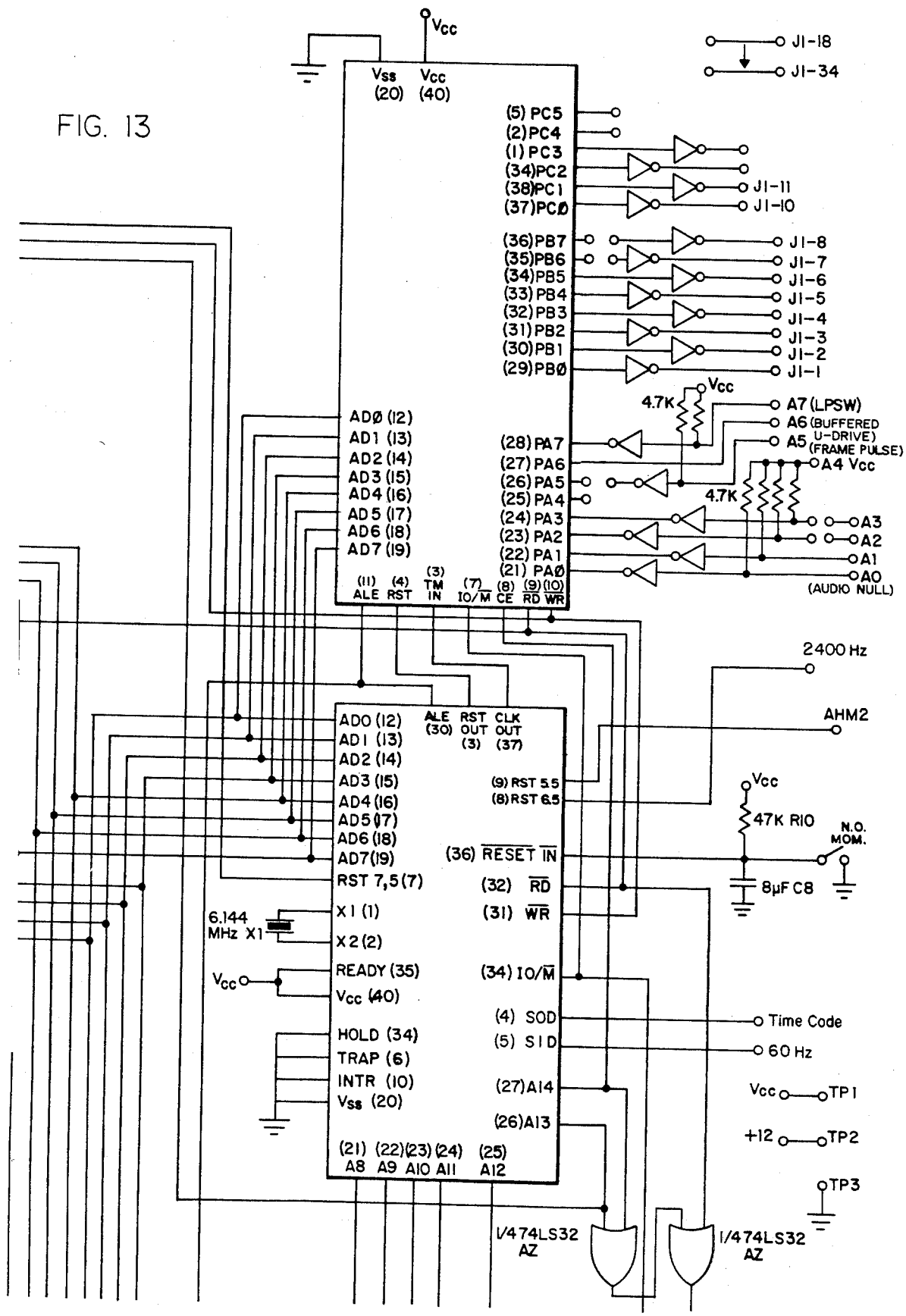
Figure 14:
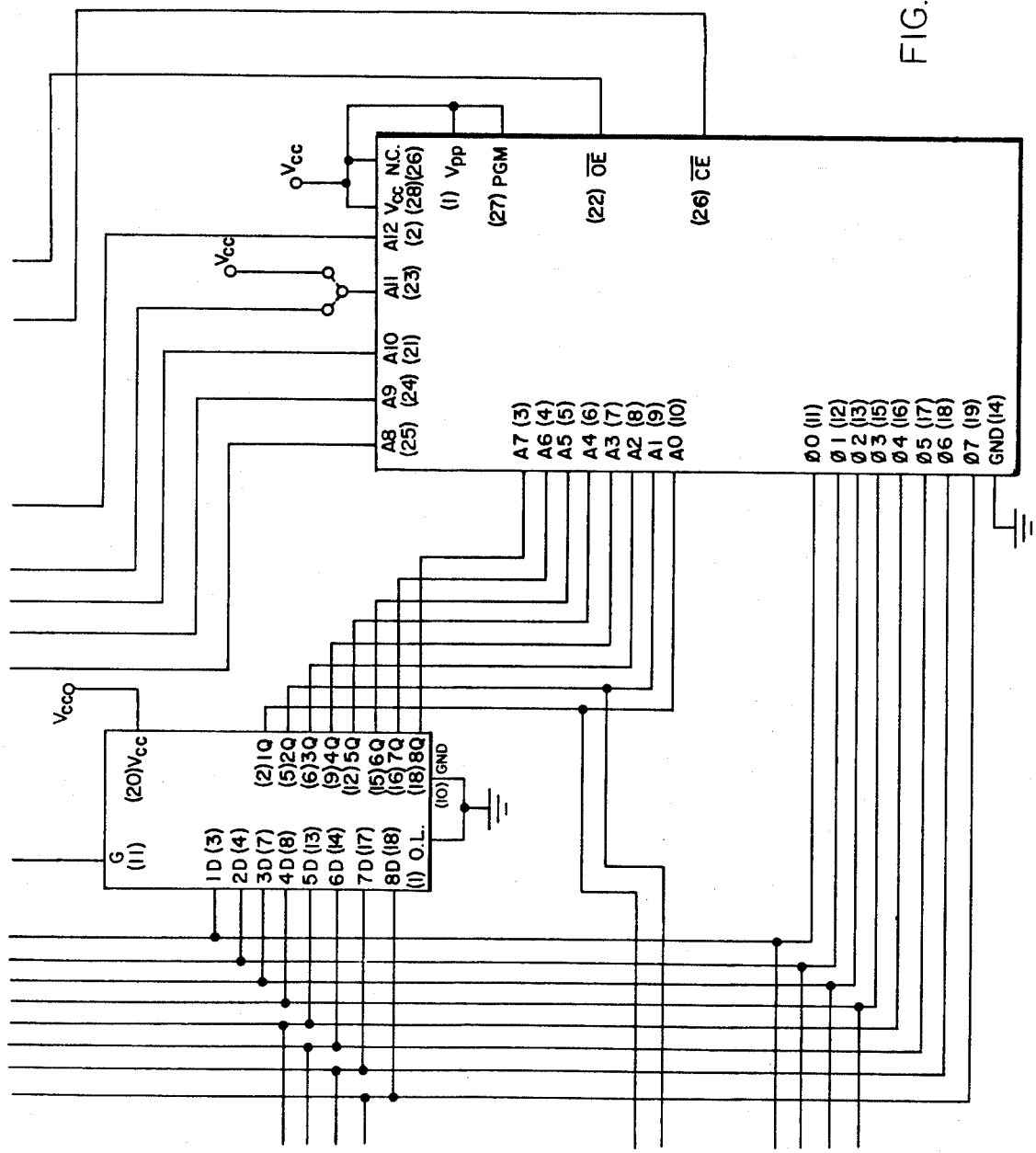

A similar high speed transfer of data takes place between the host computer and other elements of the system including the load switch 36, A/V switchers 35 and switcher interface 32 by means of the output PORTS B and C of the RAM chip of FIG. 13. More specifically, PORT B provides output signals to the switcher interface, the circuit of which will be discussed hereinafter in more detail. PORT C provides a plurality of signals for switcher selection and load switch interface. Other differences between the circuit of FIGS. 11 through 14 as compared to the circuit of FIGS. 2 through 5, reside in the signal interface between the CPU 8085 chip of FIG. 14 and the other system components to which it is connected. More specifically, unlike the microprocessor CPU of FIG. 5, the 8085 chip of FIG. 14 does not utilize an RST5.5 interrupt input, but does utilize an RST6.5 interrupt input which is the 2400 Hz. clock generated by the time code generator circuit of FIGS. 7, 8 and 9. In addition, the 60 Hz. signal generated by the circuit of FIGS. 7, 8 and 9 is also applied as the SID input to the 8085 chip. The 8085 CPU chip acts on the 60 Hz./2400 Hz. input signals from the time code generator circuit portion of FIGS. 7, 8 and 9 to produce the time code output from the SOD pin of the 8085 chip. This time code output is applied to the circuit of FIGS. 7, 8 and 9 previously described to generate the time code signal used throughout the editing system of the invention.

A significant and unique feature of the present invention relates to its use for editing in correlation with the script, that is, the dialogue of the characters in the action. In order to provide this correlative capability, the present editing system provides an audio null detector circuit of FIG. 15 which is designed to accurately define the time code of the mid-points of audio nulls that constitute potential splice points for the editor. The circuit of FIG. 15 accepts the audio input and generates a digital output which defines the time of the beginning and ending of lines of dialogue which relates to the composition of the script mimic file to be described hereinafter. The output of the audio null circuit is the signal which is applied to pin 0 of PORT A of the RAM chip of FIG. 13 previously described. The microprocessor circuit of FIGS. 11 through 14 responds to a tip switch activation, that is, a switching of the light pen switch at the last syllable of a line of dialogue, by utilizing the information provided by the audio null detector in conjunction with the timing code to define the beginning and end of the lines of dialogue on each side of an audio null. Interpolating those time codes specifies the time code of the mid-point of the audio null which constitutes a potential splice point for the editor.

Figure 15:
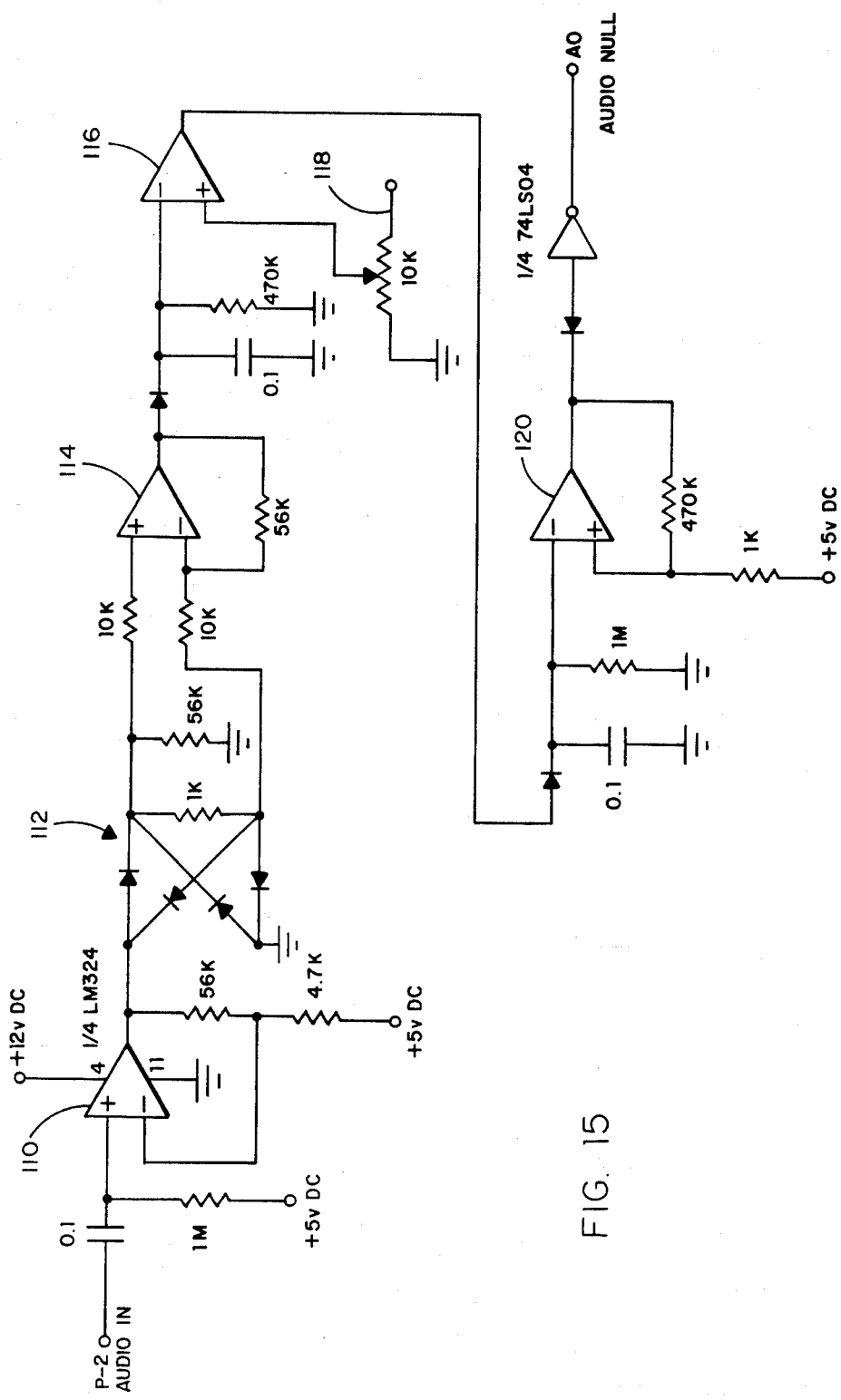
FIG. 15 is a schematic diagram of the audio null detector portion of the invention.

The audio null detector of FIG. 15 comprises four operational amplifiers stages all of which may be found on a single integrated circuit chip such as a model LM324 quad op amp circuit. The first such op amp 110 is used as an amplifier to apply the audio signal to a bridge rectifier 112. The outputs of the bridge rectifier 112 are applied to an amplifier 114, the output of which is applied to the halfwave rectifier circuit of operational amplifier 116. Op amp 116 utilizes a sensitivity potentiometer control 118 to allow selection of the circuit sensitivity to an audio null. The final stage of the circuit of FIG. 15 comprises the signal conditioning comparator circuit of stage 120, the output of which is the audio null signal which is applied to PORT A of the RAM chip of FIG. 13. It is believed that the use of an audio null detector in a video editing system to identify the potential splice points between lines of dialogue for editing purposes, is a novel contribution to the computer-based editing art.

Figure 16:
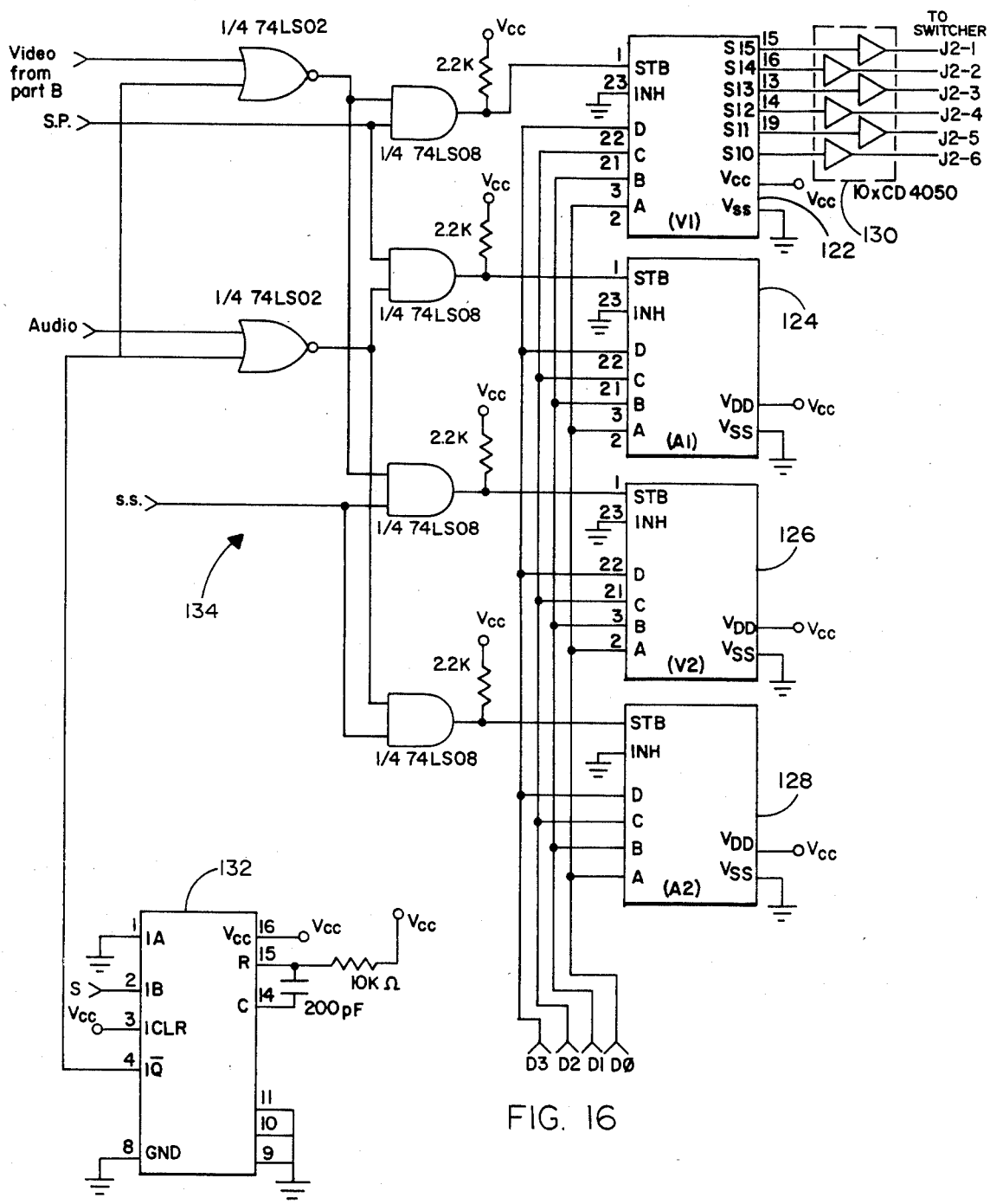
FIG. 16 is a schematic diagram of the switcher interface portion of the invention.

Referring now to FIG. 16 which is a schematic diagram of the switcher interface 32 of FIG. 1, it will be seen that this circuit comprises a plurality of 4-to-16 decoder and latch integrated circuits Model No. CD4515. Each such decoder receives four data signals, D0, D1, D2 and D3 shown in the lower portion of FIG.

16 and which comprise a 4-bit code for selecting one of sixteen output lines on each of the decoder circuits 122, 124, 126 and 128, respectively. The data signals, D0, D1, D2 and D3, are generated by the PORT B output of the time code generator microprocessor circuit of FIG. 13 discussed previously. Also generated at PORT B are video and audio select signals which are applied to the strobe terminals STB of each of the decoder chips in conjunction with the output of a one-shot 132, such as a Model 74LS123, to synchronize the application of strobe signals through the logic circuits 134 for concurrent application to the decoders 122 through 128. The output signals of the decoders are applied to a plurality of buffers, such as Model CD4050 integrated circuit buffer drivers. There are a total of sixty such signals and corresponding buffers that are generated by the switcher interface and applied to the audio video switchers 35 of FIG. 1. These control signals determine the selected mix of video and audio during the editing process from all of the playback VCRs being used in the system.

In addition to permitting selective switching between the various video and audio tracks of the VCRs of the system for the appropriate mix during the editing process, means are also provided for routing the audio, video and time code signals in the proper direction between the ¾ inch VCR 42 and the plurality of VCRs 40, depending upon the status of the editing system. For example, initially, when the editing system is set up to handle a new set of "dailies" which have been delivered to the editing system on ¾ inch video tape, that tape is loaded onto the ¾ inch VCR 42 on which it is played for loading down into the VCRs 40 for the editing process. During this loading operation the direction of signal transfer between VCRs is from the ¾ inch VCR to the VHS VCRs 40. On the other hand, during the normal editing process the direction of video, audio and time code signals between VCRs will be from the VHS VCRs 40 to the ¾ inch VCR 42 which ultimately receives the computer-controlled, edited version of the work being edited by the system of the present invention.

Figure 17:
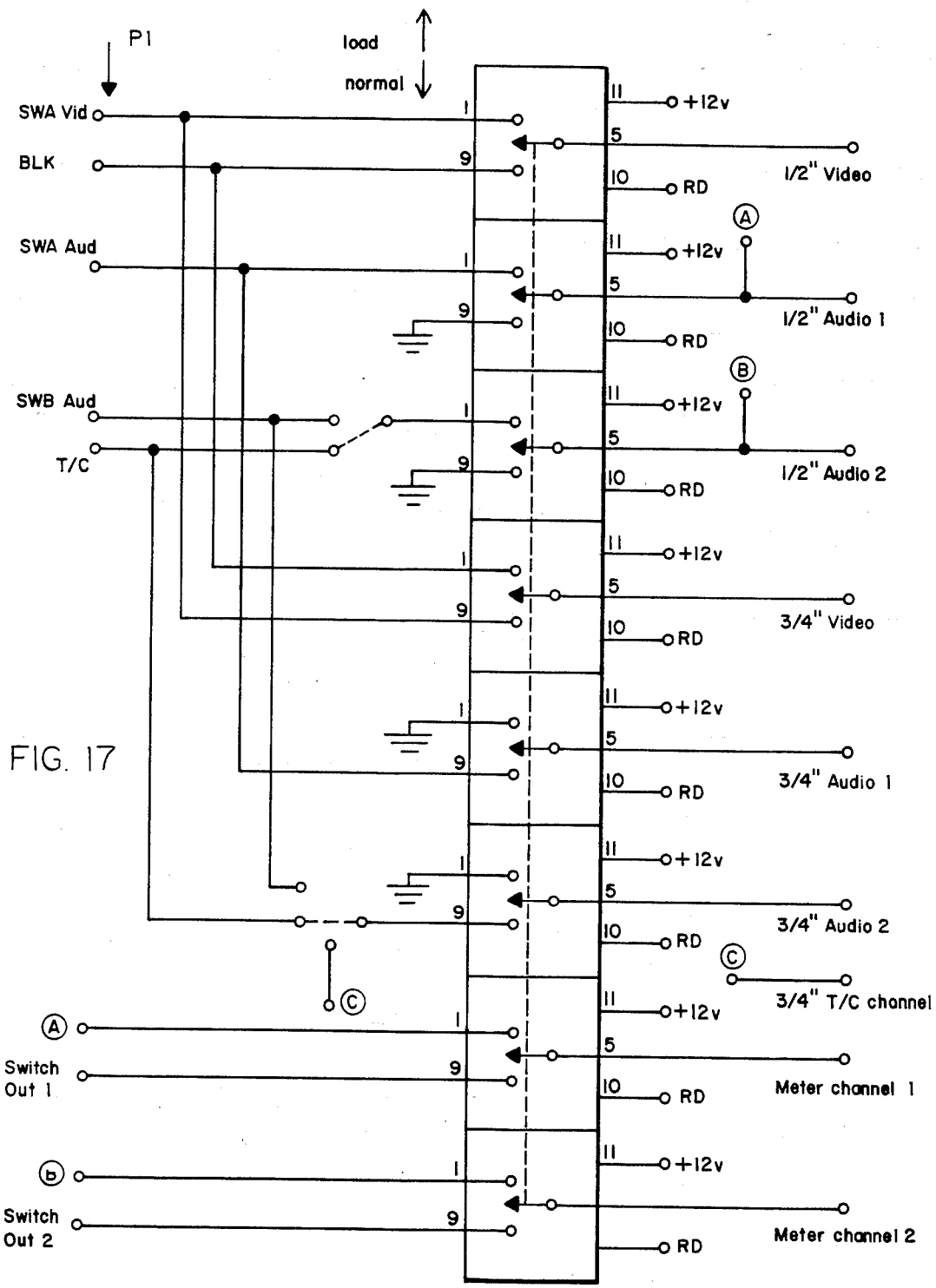
FIG. 17 is a schematic diagram of the load switcher of the invention.
Figure 18:
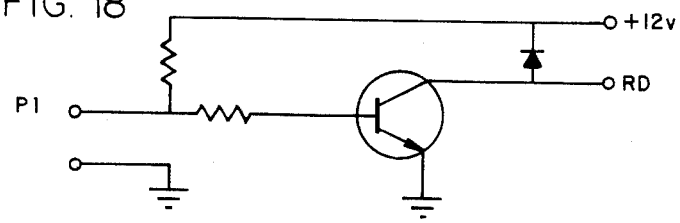
FIG. 18 is a schematic diagram of the relay driver circuit used in the load switcher of FIG. 17.

The proper directional flow between VCRs for either loading or normal editing operation, is accomplished by the load switch of FIG. 17 which utilizes the relay drive circuit of FIG. 18. Thus, for example, the black signal, which is generated by the synchronization generator 26, and which comprises a video reference signal, can be routed to either the VHS VCRs through video distribution amplifiers 38 when the load switch of FIG. 17 is in the normal position, or it can be routed directly to the ¾ inch VCR 42 of FIG. 1 when the load switch of FIG. 17 is in a load position as indicated at the top of FIG. 17. Similar selective routing of the video and audio signals, as well as of the time code signals, is provided by the load switcher of FIG. 17 utilizing a plurality of video drive circuits of FIG. 18. FIG. 18 indicates the manner in which each relay drive output RD of FIG. 17 is derived from the input to the load switch. As previously indicated, the actual audio and video analog signals, are routed by means of the audio/video switchers 35 of FIG. 1 controlled by the switcher interface 32 of FIG. 1 as described in detail in FIG. 16.

SYSTEM SOFTWARE

Figure 19:
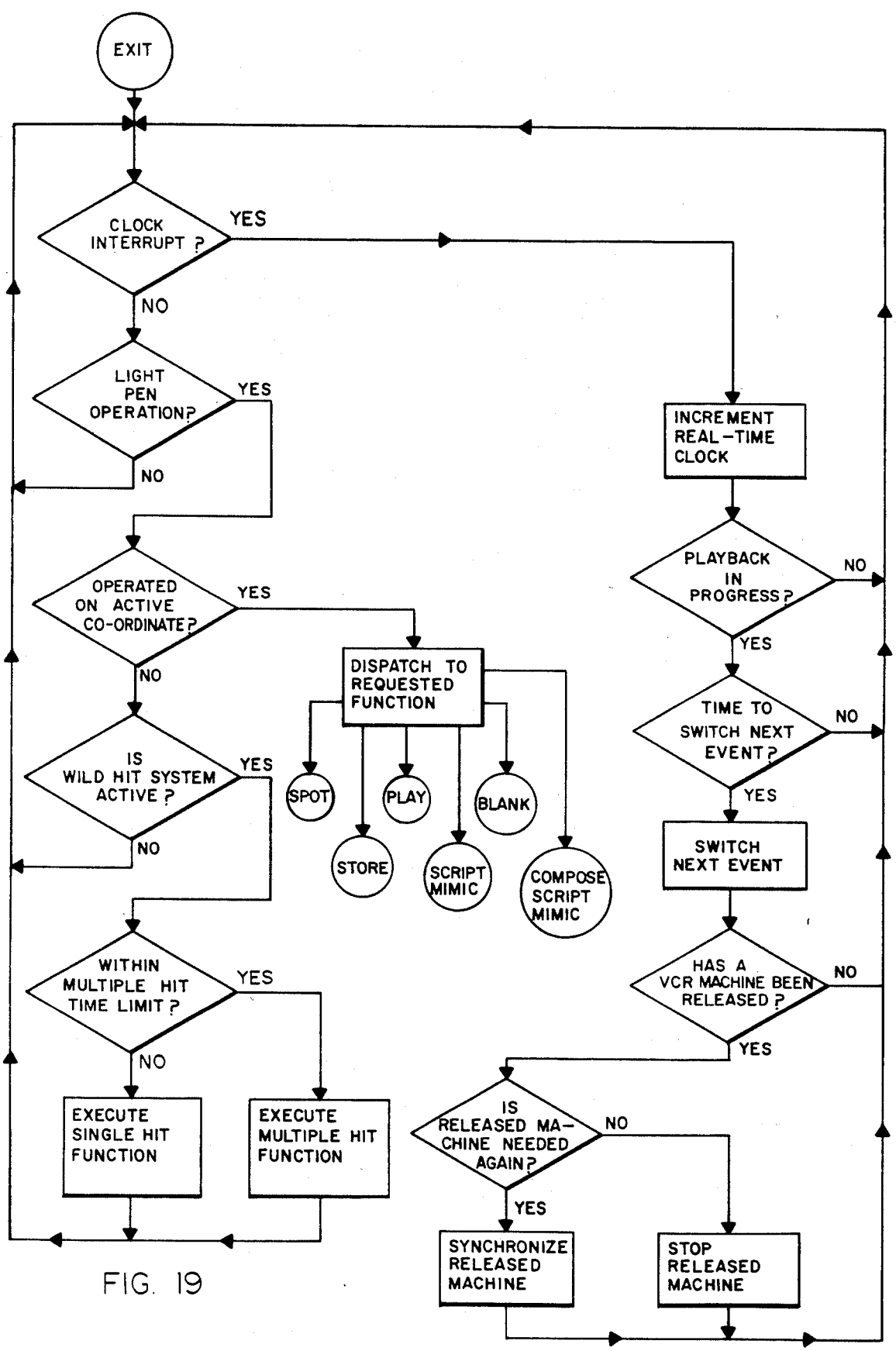
FIGS. 19 to 24 are flow diagrams used to describe the computer program operation of the invention.

The software portion of the present invention will now be discussed in relation to the flow chart diagrams of FIGS. 19 through 25. The first flow chart to be discussed is shown in FIG. 19 and may be termed the "idle" loop or "background" loop in which the system is continually monitoring for computer interrupts in the form of real time clock interrupts or light pen operation interrupts. It will be seen hereinafter that the other flow charts of FIGS. 22 through 25 all eventually terminate in an exit command which brings the software program back into the idle loop of FIG. 19 through the exit instruction as shown at the top left-hand portion of FIG. 19.

The first software operation of the idle loop of FIG. 19 comprises a test for the presence of a real time clock interrupt. The real time clock is a 60 Hz. clock which is used to control the timing of video cassette recorder playback operation for monitoring whether a scheduled event during the playback, that is, whether a change in picture content or sound content or both, has taken place as scheduled. If there has been a real time clock interrupt, then the computer system increments the real time clock and then tests to determine whether or not a playback is in progress. If a playback is not in progress, the software loops back to the clock interrupt test. However, if a playback is ongoing, the software tests to determine whether the time to switch the next event has arrived. As previously indicated, an event switch or change is a change in picture content, sound track or both. If that time has arrived, then the scheduled event is switched in accordance with the editing sequence and if such time has not arrived, the program loops back to the clock interrupt test.

After the next event has been properly switched, the software determines whether or not a VCR machine has been released. Typically, a VCR machine will be released if both video and sound track from that machine has been switched to other machines. However, there may be occasions when only video or only sound track from a particular machine has been switched and the remaining audio or video continues to be derived from that particular machine. In that case of course, that VCR machine will not have been released and the software will cycle back to the clock interrupt test. If in fact a machine has been released, the software will next determine whether the released machine will be needed again in that particular editing sequence. If it is not needed again, the machine that has been released is stopped and the software cycles back to the clock interrupt test. On the other hand, if the released machine will be needed, the released machine is synchronized by the host computer 18 of FIG. 1 and the corresponding machine interface processor 24 of FIG. 1 to properly time synchronize the released machine for its next use in the editing sequence to produce the video or audio or both in the editing process.

After synchronization the software cycles back to the clock interrupt test. Synchronization is obtained by a command from the host computer which indicates the degree of offset required to synchronize the released machine with the ongoing editing sequence. The host computer, in effect, communicates the offset required to the machine interface which reads the real time clock from the host computer and responds by controlling the released machine by reading its time code. The VCRs with which the present editing system is used are capable of forward and reverse nominal speeds, two times forward and reverse nominal speeds, ten times forward and reverse nominal speeds, rapid rewind and fast forward, as well as pause. The machine interface makes use of all the possible speed and direction controls in order to synchronize the released machine to achieve the offset commanded by the host computer.

Another function of the program represented by the flow chart of FIG. 19, that is, the idle or background loop, is to control light pen operation. Consequently, if there has not been a clock interrupt, the next test of the software is to determine whether the light pen has been operated. If the light pen has not been operated, the software cycles back to the clock interrupt test. If the light pen has been operated the software next determines whether it has been operated on an active coordinate or not. Those having skill in the art to which the present invention pertains and particularly to the light pen art, will understand that certain coordinates on the light pen monitor 12 of FIG. 1 are preprogrammed to be active. Activation of the light pen on the lines and columns of those active coordinates will produce a positive response from the test of light pen active coordinate operation and the software will branch to a dispatch operation. In this operation a programmed dispatcher directs the software to one of six operations identified as SPOT, STORE, PLAY, SCRIPT MIMIC, BLANK and COMPOSE SCRIPT MIMIC, respectively as seen in the center of FIG. 19. These functions will be discussed hereinafter in conjunction with the flow charts of FIGS. 20 through 25.

If the light pen has not been operated on an active coordinate, the software then tests to determine whether the WILD HITS system is active. The WILD HITS system is a convenient way of utilizing the light pen as a means for controlling machine operation during machine control functions. Thus, for example if an editor using an editing system of the present invention wishes to stop a machine at a precise point in the video signal, he merely hits the light pen switch against any available surface including a table top. Similarly, if the editor wishes to start a machine at a precise point, he may do so using the light pen by merely executing a multiple hit, that is, two or three hits successively spaced within less than ½ second from one another, to start the machine again in a very convenient manner. In this fashion the editor is given the added flexibility of physical convenience in controlling the machine operation using the editing system of the invention.

However, there are occasions when the WILD HITS system is not active such as when the editing system is not in a machine function control mode. Referring again to FIG. 19 it will be seen that if the WILD HITS system is not active, the software returns to the clock interrupt test. If the WILD HITS system is active, then the software next tests to determine whether the editor has utilized the light pen system within the hit time limit, that is, the computer determines whether the editor has executed a single hit function or a multiple hit function. If it is a single hit function then it is treated as a machine stopping instruction. If it is a properly executed multiple hit function, as previously described, then the computer will interpret that as a machine starting instruction. In either case, after the function is carried out and the machine is either stopped or started as the case may be, the software returns to the clock interrupt test.

Figure 20:
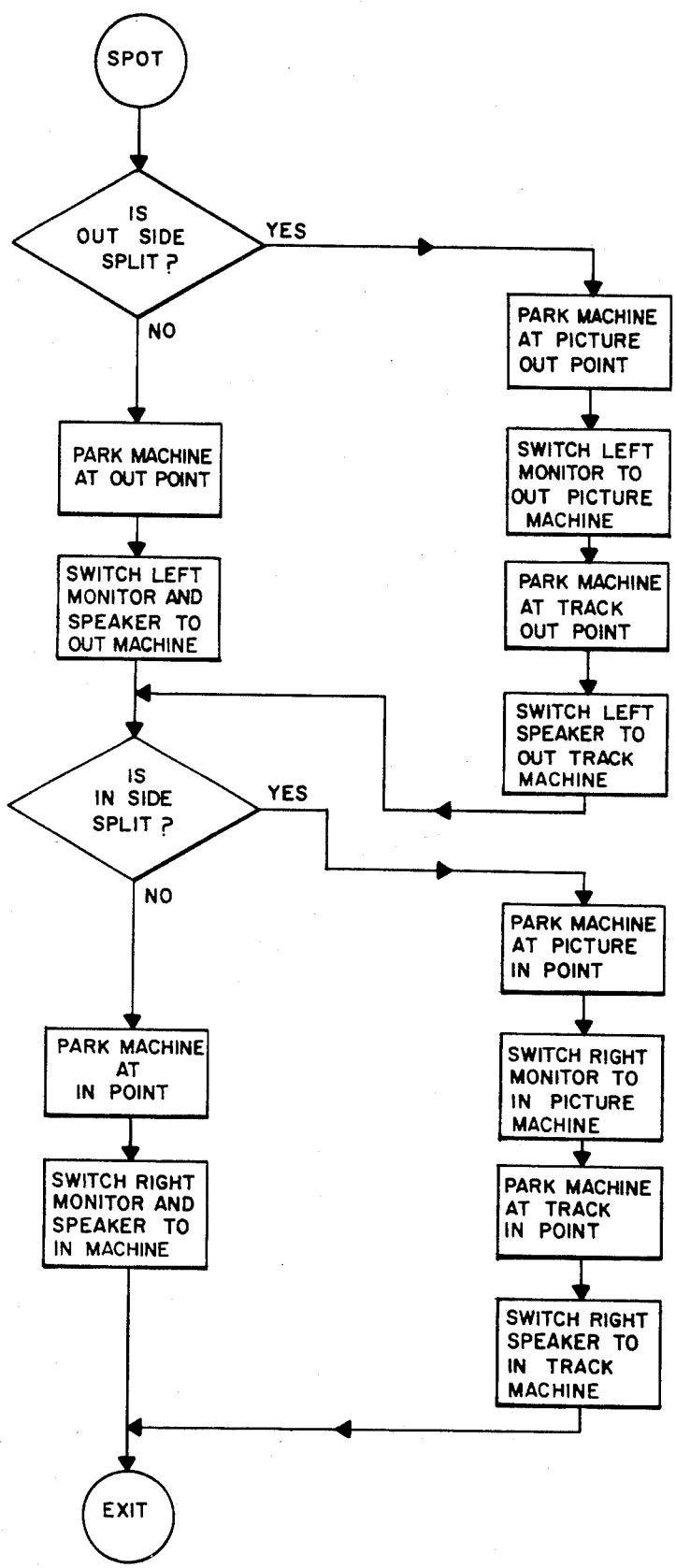

As previously indicated in the flow chart of FIG. 19, one of the dispatcher functions is SPOT. Reference will now be made to FIG. 20 which is a flow chart of the software used for carrying out the SPOT operation. The SPOT operation is a major function of the system in the editing operation. It is used to select a given edit point and to work on a specific edit. More specifically, when the system is marked at a specific given splice point, the SPOT program is designed to set the system up so that that splice point can be worked on or modified.

In editing film and videotape, a splice point may be defined as the juxtaposition of an out side and an in side. The out side is the piece of film or tape immediately before the splice and the in side is the piece of film or tape immediately after the splice. The out side occurs first in time and the in side occurs second in time. Consequently, the flow chart of FIG. 20 is effectively separated into two portions, an upper portion which relates to the out side of the splice and a lower portion which relates to the in side of the splice. The operational sequence of the software in each portion is identical except as it relates to either the out side or in side of the splice. Accordingly, only the upper portion of FIG. 20 need be discussed herein.

Referring now to FIG. 20 it will be seen that the first test of the software in the SPOT program is to determine whether or not the selected splice point has an out side which is split. The term "split" refers to picture and sound track emanating from two separate machines. If the out side is not split then only one machine needs to be controlled in order to display the out side of the editing point and accordingly, that one machine is parked at the out point adjacent the splice and the appropriate monitor and speaker are switched to the parked VCR machine. On the other hand, if the out side of the splice point is split, then two machines must be properly parked and switched, one machine associated with the picture and the other associated with the sound track as indicated on the left side of FIG. 20. This machine control operation is then repeated for the in side of the splice point and the software returns to the exit function of FIG. 19.

Figure 21:
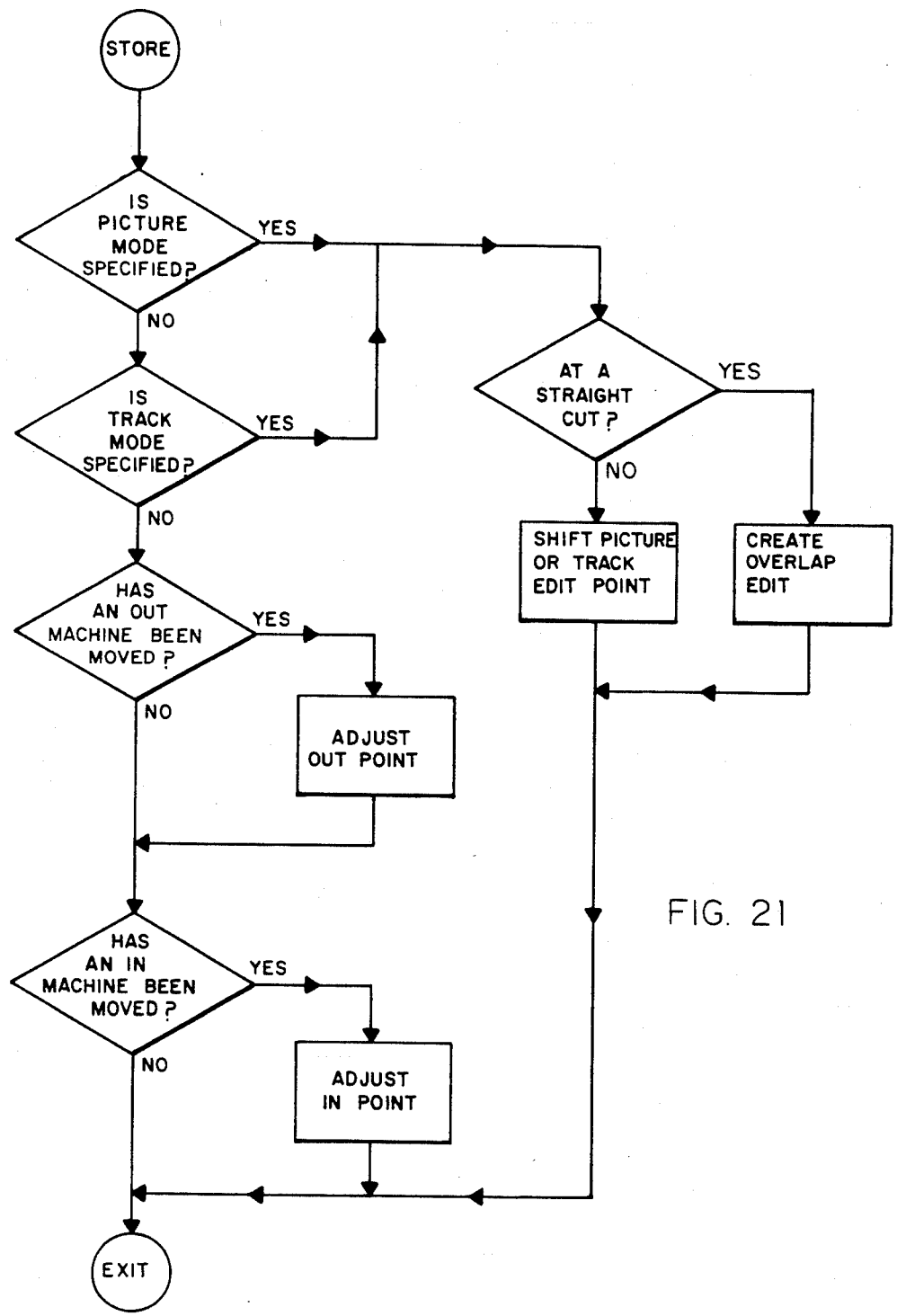

Another dispatch function of FIG. 19 is the STORE operation which is illustrated in FIG. 21. A STORE operation is a fundamental command which creates a new edit or splice or modifies a previous edit or splice. It usually follows a SPOT operation after a pre-existing edit point has been located so that previously located edit point may now be modified, or it may constitute the first operation for storing an initial edit point. Referring to FIG. 21 it will be seen that the store operation commences with two tests to determine whether the specified editing mode is for a picture edit or for a track edit.

If either one of these modes has been specified, the program then tests to determine whether the edit point is a straight cut. A straight cut is an edit point where both picture and track have been edited at the same point. Basically, if a picture mode has been specified or alternatively, if a track mode has been specified, a straight cut is to be modified to create an overlap edit where modification in the picture or track but not both is made while the other mode is retained in its original configuration. An overlap edit may, for example correspond to a situation in which a sound track is maintained while one actor speaks while the picture is edited to show the reaction of the second actor to the ongoing statement of the first.

If it is not a straight out then there may still be a shift in the picture or track edit point in a previous overlap edit configuration before the program returns to the EXIT operation. If neither the picture mode nor track mode is specified, the STORE operation is still designed to adjust the out and in points in the event that a machine has been moved from its previous spot point.

Adjustment of the out point and in point in response to a machine movement in effect redefines the spot point for later editing functions. If adjustment has been made necessary by movement of a machine from the previous spot point, these adjustments are carried out in the order illustrated in FIG. 21 before the program returns to the EXIT function.

Figure 22:
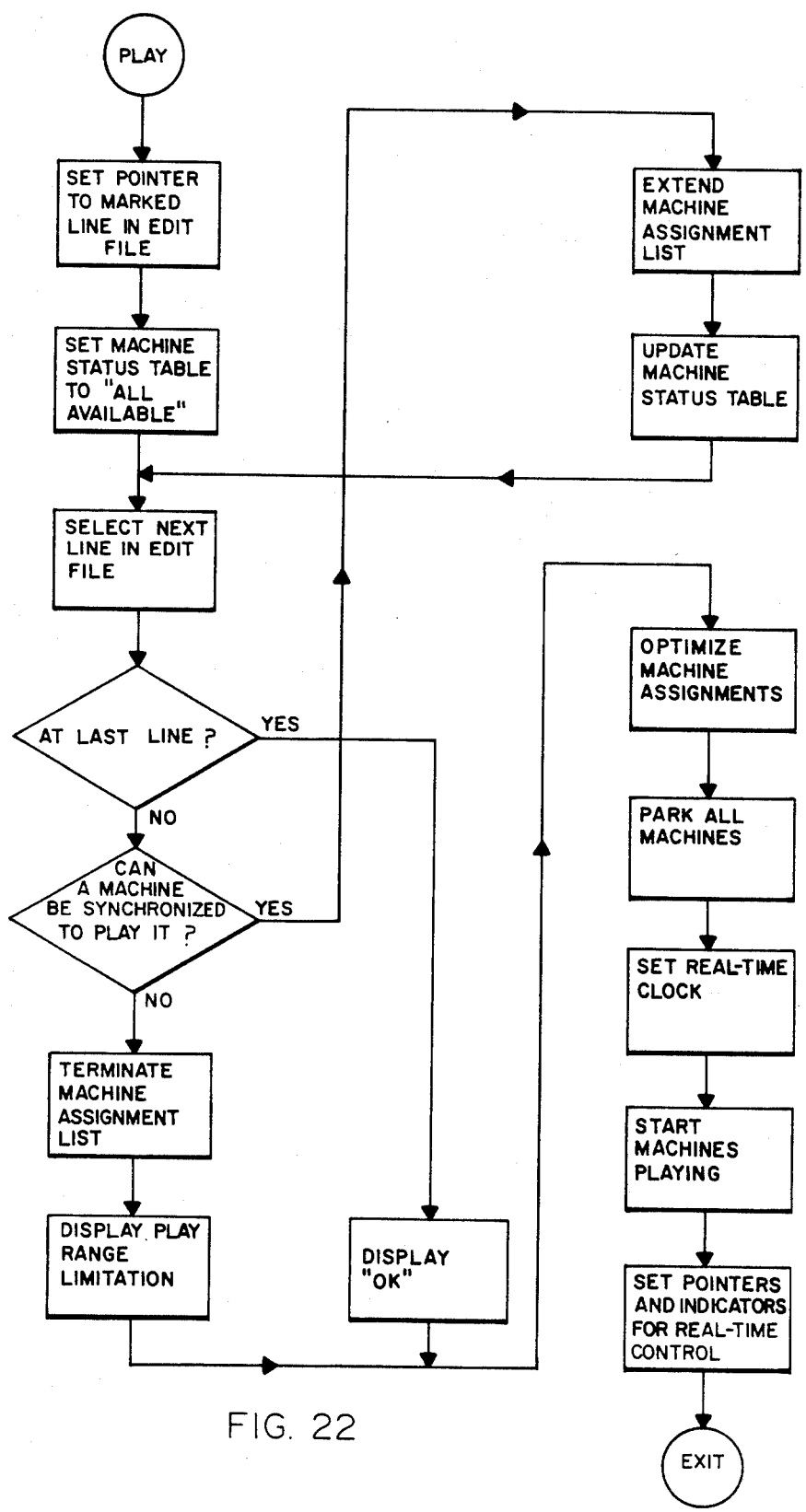

Another dispatch function of FIG. 19 is the PLAY operation which is illustrated in the flow chart of FIG. 22. The PLAY operation, in effect, composes a list that controls playback operations by scheduling machines for playing an entire file sequence when a play function is requested. The PLAY operation sets up the machines by assigning them their play operations in order to accomplish the playback of a particular edited configuration. It will also notify the editor in the event that it is beyond the scope of the play capability of the playback VCRs to playback an entire file because the machines cannot satisfy the particular sequence requested.

More specifically, referring to FIG. 22 it will be seen that the first operation in the play software sequence consists of setting a pointer to the marked line in the edit file, that is, to the line at which the play is to commence. The software then sets a machine status table to "all available" and selects the next line in the edit file. The software then tests to determine whether this next line in the edit file is in fact the last line in the edit file. If it is the last line, that demonstrates that the schedule of play sequence is within the capability of the system for the available machines. Therefore, a display of the message "OK" is generated and the system moves on to optimize the machine assignments to minimize the waiting time between lines or segments. All of the machines are parked where they have to be in order to accomplish the play sequence requested. The real time clock is set and the machines start playing. Finally, the real time clock takes over the operation of the play in accordance with the right-most portion of FIG. 19.

On the other hand, if the line selected in the edit file is not the last line, the software must determine whether a machine can be synchronized to play the particular line requested. If it can play that next line, the machine assignment list is updated along with the machine status table and the software loops back to the next line selection. On the other hand, if no machine can be synchronized to play the next line, the machine assignment list is terminated and a play range limitation is displayed to inform the editor of the limit of what can be played in the particular edit file upon which he is working. In the later case, the machine assignments are still optimized to play within that range, all the machines are parked and the real time mark is set as previously indicated before the operation returns to exit and the idle or background loop of FIG. 19.

Figure 23:
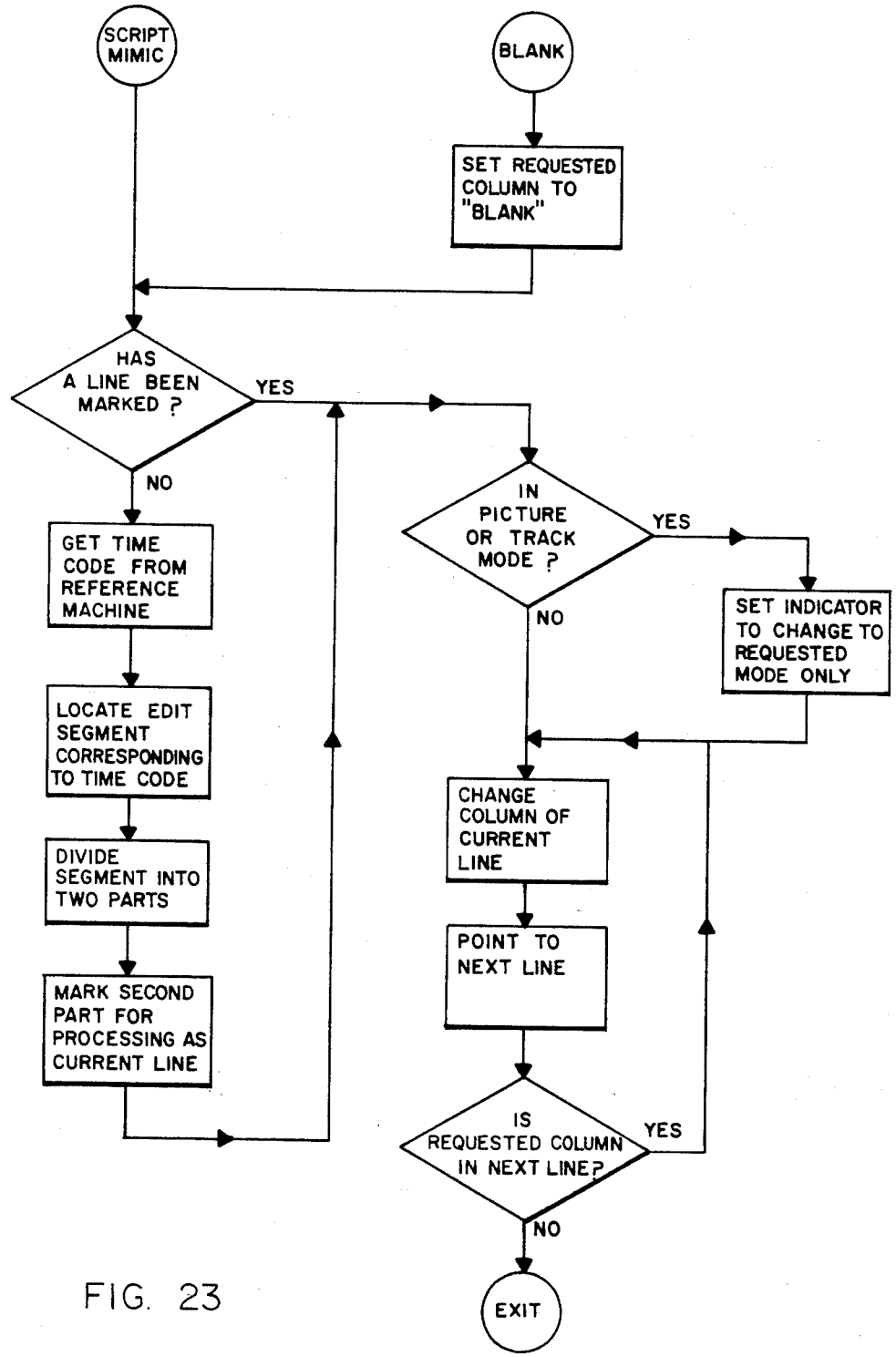

Reference will now be made to FIG. 23 which displays the flow chart for the SCRIPT MIMIC software operation. The SCRIPT MIMIC routine is another dispatch function of FIG. 19. The BLANK routine, as will be seen hereinafter in FIG. 23, is combined with the SCRIPT MIMIC program because their logic functions are identical. The software program of FIG. 23 shows the effect of a light pen hit directly on the main body of the script mimic display of the light pen monitor and it also contains an entrance for hitting the word BLANK. A "script mimic" hit by the editor will change the edit file to allow access to a new piece of material for creating a splice. A hit of the word "blank" is used to create a splice to blank material, for example, for a silent track or a black picture.

It will be seen hereinafter that the script mimic display is divided into a plurality of lines and columns. Each column corresponds to a particular take and each line corresponds to a particular edit line which usually correlates to a line of dialogue in the script. Referring to FIG. 23 it will be seen that the first test carried by the software in the SCRIPT MIMIC program and for that matter the BLANK program subsequent to setting the requested column to blank, is a test to determine whether a line has been marked. If a line has been marked that is already an arbitrary designation for a splice point such as that which may be derived for example from an audio null detector output indicating a silent portion in the sound track. If such designation for a splice point already exists, the program branches to the right of FIG. 23 and tests to determine whether the system is in the picture or track mode wherein only the picture or only the sound track is being edited. If it is in one or the other of these two possible modes, the software sets an indicator indicating the unitary mode requested.

After this operation is performed or if the system is not in the picture or sound track only mode, the software then changes the column of the current line indicating a change from the current tape corresponding to one track to a new tape corresponding to the alternative track to which the editor has switched as the splice point. The software then points to the next line in the new column and determines whether the next line contains the current column. If it does that indicates that the editing process will utilize material in the same take and the software loops between the "yes" output of the requested column test through the steps of changing the column of the current line and pointing to the next line. This process in effect keeps the editing process going with the take or VCR tape which corresponds to the requested column so that unnecessary tape changes are avoided.

Returning to the initial test of the SCRIPT MIMIC and BLANK software programs, if in fact a line has not been marked, then a series of operations must be first performed before the picture or track mode tests. More specifically, in creating a splice to new material, if the editor has not marked a specific line, the out point of the then playing machine, that is, the machine playing the take from which the editor now wishes to switch to a new take, is considered the reference machine. The software obtains the time code from the reference machine for the out point. The software next locates the edit segment corresponding to the time code of the out point of the reference machine. This segment is then divided into two parts, one part between the time code of the stop point and the out point and the other between the time code of the stop point and the in point. Then the second part, that is, the second part of the segment that occurs between the stop point and the in point, is marked for processing as the current line for splicing to another piece of material. Thus in effect, the left portion of FIG. 23 represents the software program which carries out the steps equivalent to the marking of a line adjacent a splice point to new material. Whether or not the line has been marked after the line change portion of the SCRIPT MIMIC program represented by the right half of FIG. 23 has been carried out, the program exits to the background loop of FIG. 19.

Figure 24:
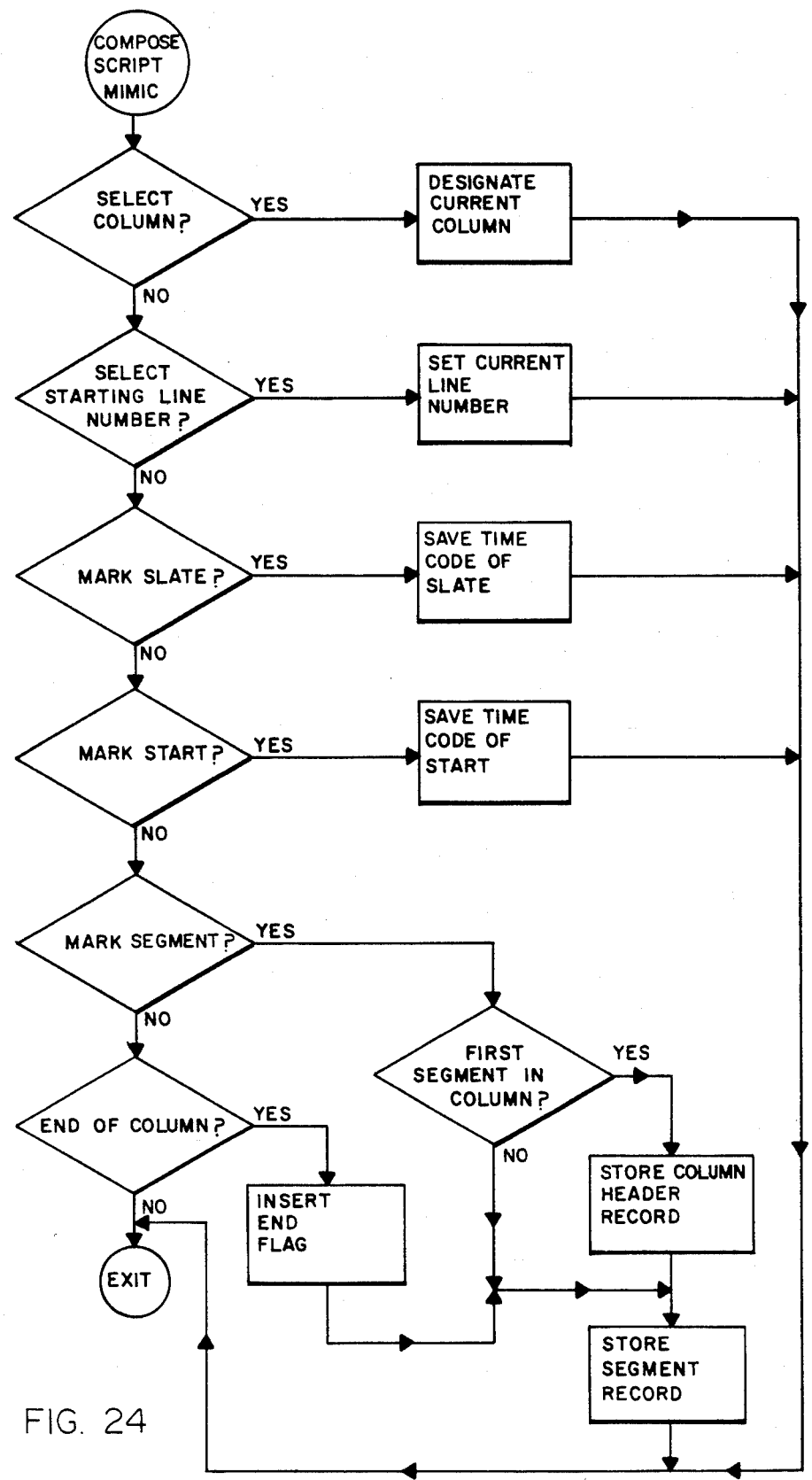

Reference will now be made to FIG. 24 which discloses the COMPOSE SCRIPT MIMIC software routine. This routine is used to compose a script mimic file before the editing process begins. In effect it sets up or composes a file which the editor uses for editing. The software flow chart of FIG. 24 is configured so that the left-hand column comprises a series of essential steps in the script mimic composition process. The first of these steps is to determine whether or not a column is selected, the second is to determine whether a starting line number has been selected, the third is to determine whether or not the slate has been marked, that is, the position on the tape at which the editing slate is shown in the video to inform the viewer of the scene and take number of the particular work being viewed.

The next test is for determining whether the start point has been marked. The start point is typically the point in the work in which the director yells "action". As seen in FIG. 24, if any of these initial steps in the composition of the script mimic file, result in a positive response then the appropriate step is carried out. For example, the current column is designated as the selected column, the current line number is designated as the starting line, the time code of the slate presentation on the tape is saved and the time code of the start point is saved. In each instance, as the step is carried out, the program recycles to the exit point and back to the background loop of FIG. 19.

Ad additional step is determination of segment marking. If the segment has been marked the software then determines whether or not this is the first segment in the column. If it is the first, then the software stores the column header or record indicating the nature of the column and then stores the segment record. If this is not the first segment in the column, the column header storage step is skipped and the program goes directly to the store segment record step. Finally, the software determines whether or not this is the end of the column. If it is the end of the column an end of column flag is inserted, the segment is stored in the record and the software returns via the exit to the background loop of FIG. 19.

SYSTEM OPERATION EXAMPLES

TABLE I represents the first display screen seen when the invention is started up. This is called the "BASE" display or "SYSTEM MASTER". The "DISK CONTENTS" part of the display shows which data files are present on the disk in the lower drive.

TABLE I

| EDITING MACHINE | | |
|---|---|---|
| | | |
| | DISK: BVR #66 MOVIN ON | |
| | FILE | VERSIONS |
| FILE ACCESS | ACT1 PT1 | 12 |
| | ACT1 PT1 | 12 |
| | ACT1 PT2 | 123 |
| EDIT | ACT1 PT2 | 123 |
| COMPOSE SCRIPT MIMIC | | |
| FILE PROCESSING | | |
| UTILITY | | |
| TIME CODE MODE:- DROP FRAME | | VER. 5731 |

The user first obtains a data file from the computer disk by pointing the light pen at the words "FILE ACCESS". The white rectangle (cursor) will light up the character at which he is pointing. When he presses the pen against the screen to activate the tip switch, the screen will change to TABLE II.

TABLE II

| FILE ACCESS | | | |
|---|---|---|---|
| | | DISK: BVR #66 MOVIN ON | |
| RESTORE CURRENT SPLICES | | FILE | VERSIONS |
| GET FILE FROM DISK | A | ACT1 PT1 | 12 |
| | >B< | ACT1 PT1 | 12 |
| | C | ACT1 PT2 | 123 |
| * SAVE FILE ON DISK | D | ACT1 PT2 | 123 |
| NAME NEW FILE | | | |
| LABLE DISK | | | |
| ERASE CURRENT FILE | | | |
| | | ACT1 PT1 | |
| RETURN TO SYSTEM MASTER | ## | 0 1 2 3 4 5 6 7 8 9 | |
| | ## | A B C D E F G H I J | |
| | -- | K L M N O P Q R S T U | |
| | ## | V W X Y Z - / * # # | |

The user points the light pen to the letter "B" and activates the tip switch. Pointers will appear around the "B" (>B<) to show that it is selected. Next he will "hit" with the light pen the words, "GET FILE FROM DISK". There will be a delay of about five seconds (during which the cursor will stay frozen at the place hit), after which an arrow will appear to the right of the >B< pointing to the filing name. This indicates the file that has become active.

Now the user hits "RETURN TO SYSTEM MASTER", which will return to the base display. Then he hits the word "EDIT". The display will now change to that shown in TABLE III.

TABLE III

| RETURN | | DISK: BVR #66 MOVIN ON | | | | FILE: ACT1 PT1 ## ## |
|---|---|---|---|---|---|---|
| 1 | WHD | WHD | | | | |
| 2 | | | 1m | 1A | 1B | |
| 3 | | | 1m | 1A | 1B | |
| 4 | | | 1m | 1A | 1B | |
| 5 | | | 1m | 1A | 1B | |
| 6 | | | 1m | 1A | 1B | 1C1 1C2 |
| 7 | | | 1m | 1A | 1B | 1C1 1C2 |
| 8 | | | 1m | 1A | 1B | 1C1 1C2 |
| 9 | | | 1m | 1D 1A | 1B | 1C1 1C2 |
| 10 | | | 1m | 1D 1A | 1B | 1C1 1C2 |
| 11 | | | 1m | 1D 1A | 1B | 1C1 1C2 |
| 12 | | | 1m | 1D 1A | 1B | 1C1 1C2# |
| 13 | | | 1m | 1D 1A | 1B | 1C1 1C2 |
| 14 | | | 1m | 1D 1A | 1B | 1C1 1C2 |
| 15 | | | 1m | 1D 1A | 1B | 1C1 1C2 |
| 16 | | | 1m | 1D 1A | 1B | 1C1 1C2 |
| 17 | | | 1m | 1D | | |
| 18 | | | 1m | 1D | | |
| 19 | | | 1m | 1D | | |
| | | EDIT BASE | | | | |
| _VIEW# | | VERSIONS: 1 2 * * * * | | CURRENT: 0 | BLOCK | |
| _ASSEMBLE# | SAVE | ERASE | GET | | | |
| _EDIT# | | | | SELECT: | | |

The main part of the display of TABLE III is called a "SCRIPT MIMIC". This portion of the screen is displayed from a data file which is composed as part of the process of loading the system and composing the script mimic.

Each column on the display corresponds to a line on the lined script, which in turn corresponds to one take from the dailies. On the script pages, each line of dialogue will have been numbered on the left side of the page. These numbers correspond to the numbers on the left side of the screen.

The screen of TABLE III is the "BASE" display of the "EDIT" function. Its main purpose is to provide access for getting and saving up to six cut versions of the scene. To get the elementary version, hit the digit 1 at location (A), then the word "GET" (which then will be flagged ">GET<"), then the digit 1 will appear after the word "SELECT:-". The SCRIPT MIMIC display now will appear "marked up", with one column on each line high-lighted. This "mark-up" tells the user which column, or take, has been selected for each line of dialogue.

Now the user hits the word "EDIT" in the lower left corner of the screen. The display will now change to TABLE IV.

TABLE IV

| RETURN | | | | | DISK: BVR #66 MOVIN ON | | FILE: ACT1 PT1 ## |
|---|---|---|---|---|---|---|---|
| _1/03:18 | WHD | WHD | -WHD | -WHD_ | | | |
| 2/01:06 | 1m | 1m | | | 1m -- | 1A | 1B |
| 2 00:29 | 1m | #### | | | 1m | 1A | 1B |
| 2 10:00 | 1m | 1m | | | 1m -- | 1A | 1B |
| 3/04:27 | 1m | 1m | | | 1m _ | 1A | 1B |
| 4/01:05 | 1m | 1A | | | 1m | 1A -- 1B | |
| 4 06:14 | 1A | 1A | | | 1m | 1A _ 1B | |
| 5/03:17 | 1B | 1B | | | 1m | 1A | 1B -- |
| 6/06:17 | 1m | 1m | | | 1m -- | 1A | 1B 1C1 1C2 |
| 7/01:08 | 1m | 1m | | | 1m _ | 1A | 1B 1C1 1C2 |
| 8/03:13 | 1C2 | 1C2 | | | 1m | 1A | 1B 1C1 1C2_ |
| 8 00:10 | 1B | 1C2 | | | 1m | 1A | 1B 1C1 1C2_ |
| 9/02:12 | 1B | 1B | | | 1m | 1D 1A | 1B -- 1C1 1C2 |
| 10/02:27 | 1C2 | 1C2 | | | 1m | 1D 1A | 1B 1C1 1C2_ |
| | | | | | | # -----OUT---#----------IN----- | |
| | | | | | | # X2 # | X2 |
| BLANK | STEAL | SWITCH | | | PICTURE | #RP ## ### RP | ## ## |
| | | | PLAY | | | # 1/5 # | 1/5 |
| LEV 1 | | | | | TRACK | #FR ## ### FR | ## ## |
| | | SPOT | | | | # 1/20 # | 1/20 |
| _VIEW# | _ADJUST# | | PREVU | | OUT | #** ## ### ** | ## ## |
| | | | 2 3 4 | | | #PL JOG # PL | JOG |
| _BASE# | _MODIFY# | STORE | | | IN | #** ## ### ** | ## ## |

This screen is the editor's primary working display, and its various elements are explained below. The user may hit the word "PLAY" in the lower middle of the screen. This will put the VCR machine into operation, and after a short delay the user will see and hear the scene played through on the left hand monitor. At the same time, he will see on the display screen a dashed horizontal line that will work its way down the SCRIPT MIMIC, tracking the lines of dialogue in step with the playing of the scene.

After the play-through stops, the user may hit the digit 1 in the upper left hand corner of the script mimic. He will then have "marked" line No. 1. Note, if he hits any of the line numbers at the left side of the display, he marks the line he hit. If he has last "marked" line No. 1, then he hits "PLAY". The system will play the scene again from the start. If he "marked" a higher line number he will get a PLAY that will begin with the segment preceding that line, so that he will see the splice that cuts to the line of dialogue he has marked, followed by the remainder of the cut scene.

We will introduce the cutting process through the particular mode of operation that most closely parallels the usual approach to film cutting.

The first step is to get back to the status the user would be in when starting on a new uncut scene. To do this, he returns to the BASE display of TABLE III by hitting the word BASE in the lower left corner. Then, in the lower center, he hits the right-most asterisk to SELECT version 6, which is EMPTY, then "GET", then the 6 following "SELECT:-". The effect of this will be to erase the markings on the SCRIPT MIMIC. This returns to the earlier appearance of the screen before version 1 which demonstrated playing through the cut scene.

Now the user hits the word EDIT. The screen now looks like TABLE V.

"IN" splice since we are starting the scene ("OUT" and "IN" correspond to what are also called the "A" and "B" sides of a splice).

To stop the tape once it is in motion, hitting the legend "FR" will freeze the picture, but a much easier method is also provided. Anytime the user operates the light pen tip switch off the screen (or against a blank part of the screen) such as against the table-top, the material, if playing, will freeze.

There are four basic choices of forward-reverse motion, indicated by "JOG", "1/20", "1/5" and "X2", from bottom to top. The thick arrows, pointing left and right, are the active locations to be hit with the light pen (right is forward, left is reverse). In "JOG" the picture moves exactly one frame, in either direction, for every hit. The "1/20" speed is a very slow, frame-by-frame speed, from which it is easy to freeze the picture on a given chosen frame. Usually, also, the sound can be

TABLE V

| RETURN | | | DISK: BVR #66 MOVIN ON | | | FILE: ACT1 PT1 ## ## |
|---|---|---|---|---|---|---|
| 1 | | WHD | WHD | | | |
| 2 | | | 1m | 1A | 1B | |
| 3 | | | 1m | 1A | 1B | |
| 4 | | | 1m | 1A | 1B | |
| 5 | | | 1m | 1A | 1B | |
| 6 | | | 1m | 1A | 1B | 1C1 1C2 |
| 7 | | | 1m | 1A | 1B | 1C1 1C2 |
| 8 | | | 1m | 1A | 1B | 1C1 1C2 |
| 9 | | | 1m | 1D 1A | 1B | 1C1 1C2 |
| 10 | | | 1m | 1D 1A | 1B | 1C1 1C2 |
| 11 | | | 1m | 1D 1A | 1B | 1C1 1C2 |
| 12 | | | 1m | 1D 1A | 1B | 1C1 1C2# |
| 13 | | | 1m | 1D 1A | 1B | 1C1 1C2 |
| 14 | | | 1m | 1D 1A | 1B | 1C1 1C2 |
| 15 | | | 1m | 1D 1A | 1B | 1C1 1C2 |
| 16 | | | 1m | 1D 1A | 1B | 1C1 1C2 |
| 17 | | | 1m | 1D | | |
| 18 | | | 1m | 1D | | |
| 19 | | | 1m | 1D | | |
| _EDIT# | | | | | | |
| _VIEW# | SPLICE FILE EMPTY | | | | | |
| | MARK INITIAL CUT | | | | | |
| _BASE# | | | LEV 1 | | | |

This mode can be used to mark an initial "rough cut", but instead we will proceed to cut the scene in normal film cutting style, splice by splice. The user will hit the word EDIT in the lower left corner. The screen will now look like TABLE IV.

The master shot column of the SCRIPT MIMIC will now be marked solidly through the scene. This illustrates one of the principles of the splice data organization. This is that whenever the user has a "SPLICE FILE" that represents a cut of the scene, it is always complete in the sense that it always represents a complete cut of the entire scene; it is never broken up into separate pieces. When the user first goes into the EDIT mode with an uncut scene, he is automatically given a "cut" which usually will be the master shot throughout. In the sample case here, there is a single master running the length of the scene, so it is selected.

The user's first decision is what frame of the master to start on. The user hits the word "SPOT". His right hand monitor, after a tape search delay, will show him the slate of the master shot.

To use VCR machine transport controls by which the user positions the picture and track to the exact frame on which he wants to splice, note the right hand section of the lower part of TABLE IV. There are two identical sets of controls, one for the "OUT" side and one for the "IN" side (left and right monitors, respectively) of the splice. For the moment, we have only an heard if the level is raised to maximum. The "1/5" speed is probably generally more useful when the exact frame is being chosen very critically, and it is also generally better for detecting a break in the sound. The "X2" speed is double normal speed, and is the highest speed provided for substantiall movements through the material. The "RP" function in the upper left corner of the control area is a compound feature of convenience. It stands for "REPLAY", and hitting it causes the tape to rewind for a short distance, then automatically to go into play. It is useful on occasion to play a short section of material repeatedly for close examination.

The first step in cutting a scene is to locate the frame on which to start the master shot. After positioning the material where the user wants it, he hits the word "STORE". The picture will move from the right to the left monitor, the display will blink, and the picture will also take a slight jump (the latter serves a technical purpose to locate exactly where the user had it parked). The user has now stored the first "SPLICE".

To review the effect of this action, the user may hit the word "PLAY". The system will now show him the effect of his start point selection by cutting into the master shot at the point he has marked.

To make an actual splice, the user does a "PLAY" and stops it by freezing the picture by ticking the light pen against the table-top at the point he wishes to leave the master to go into the first desired close-up. It is not necessary to stop "on the fly" at the exact spot. If he overshoots or anticipates the desired spot, he can use the controls for the "OUT" side to position the material exactly where he wants it.

The next step is to specify where the user is going, i.e., what shot he wants to splice to for the "IN" side. This is called a "SWITCH". After hitting "SWITCH" (note that the word then will be flagged ">SWITCH<"), he just hits the desired column. He can hit it on any line within its range. After he hits the column, following a short wait, the right monitor will show him the frame to which he is splicing. In most cases, this will come up very close to where he will want it. In spotting the tape at this point, the system completes the action by playing up to the point, then freezing the picture, so that he hears the dialogue immediately leading up to the splice point, which will tell him how close he is to the desired place. He can now, if he wishes, adjust the "IN" side to the precise point he wants. The next step is to hit "STORE", as previously done for the initial "IN" point.

Now if he hits "PLAY" he will see a playback of his first splice. After the splice passes, he can then proceed in the same manner, stopping at the point he wishes to "SWITCH"0 to another angle, spotting both the "IN" and the "OUT" points, then hitting "STORE" to save the splice. The "OUT" point of the splice can be adjusted either before he does the "SWITCH" to another column, or at the same time he is adjusting the "IN" side. After each splice is stored, he can PLAY from any point to review as many of the previously made splices he might wish to see, or he can review only the splice he just made.

It is not necessary to replay each splice to proceed through the scene. After the user has made a few splices from a "PLAY", he may, after hitting "STORE", using the "PL" function of the "OUT" machine controls to run the material down to the next splice point. He can then "SWITCH" the same way as if he had used the "PLAY" mode. This is a faster process to use once the user has feel for the system and does not need to preview every splice after making it.

There are some additional conveniences that can be used, and alternate approaches to making the first cut, but the process described is the basic one to use in the initial period of working with the system. The next function described is that of adjusting a splice once it has been made.

First, the user marks the line number of a prior splice. This illustrates one very important convention in script mimic display usage. To select a splice to be worked on in an existing splice file, he points to the line below the splice. By marking that line number he as selected the splice between the dialogue corresponding to the "OUT" line and "IN" line of a splice. Now, having selected the splice he hits the word "SPOT". The system will now, after a short wait, set up the "OUT" and "IN" frames on the left and right monitors. He can now follow the same procedure as he did in first cutting, moving the "OUT" and "IN" points then hitting "STORE" to change the splice. He can experiment with this splice if the pacing of the dialogue allows some latitude between a "tight" or a "loose" connection of the two lines of dialogue.

To illustrate the structure and rationale of the PLAYBACK process of the present invention, FIG. 25 provides an illustration of the typical appearance of a tape with a master and six additional takes, the master being identified by the dash and the takes being identified with the letters A through F. FIG. 25 shows in simplified rough time relationship where the line numbers on each shot could fall, not quite lining up because no two shots are likely to run at exactly the same pace. However, because of the versatility and unique machine interface control of the editing VHS VCRs of the present invention, the six copies would line up in parallel across the six machines for a specific correlation point such as line 3 of each take as shown in FIG. 26. It will be seen in FIG. 26 that if the six takes continue to play in synchronization as shown, they will eventually be out of step in a short time. However, the system of the present invention is capable of keeping all six takes in step by line number correlation points at all times for virtually all editing requirements. Thus, it will be seen in FIG. 26 that line No. 3, that is, a particular identified line of dialogue or segment of a line of dialogue from each of the various takes is aligned in time to be presented to the playing heads of the respective video tape machine so that the editor can readily select the picture and sound track of his respective choices for the final work during the editing process and furthermore, the present invention provides this capability for virtually all editing situations despite variations in the time delay between line numbers or between prospective splice points.

It will now be understood that the present invention comprises a means for practicing the art of film editing in a more efficient manner, thereby permitting a substantial reduction in the time and costs attributable to the editing process. The present invention facilitates a style of editing decision making which permits low cost presentation of various versions of the work for comparison with the edited version. The invention permits the editor to select segments of different takes for splicing with complete independence of picture and sound track sources and timing. Although a number of unique features of the invention have been disclosed herein, those unique features which are of particular advantage in the editing process include correlating the editing process with the script of the underlying work on a line-by-line basis and alos providing means for automatically identifying prospective splice points based on the characteristics of the sound track associated with the work to be edited. Furthermore, another unique feature relates to the architecture of the electronics of the present invention wherein each video player/recorder of a plurality of such players/recorders is controlled by its own dedicated machine interface computer, each communicating with a central host computer utilizing a novel memory mapping communication configuration for substantially improving the speed and efficiency of the editing process as compared to the prior art.

Those having skill in the art to which the present invention pertains will now as a result of the teaching herein appreciate that various modifications and additions may be made to the specific exemplary embodiment disclosed herein. By way of example, various alternative forms of storage of picture and sound information signals may be utilized in lieu of video player/recorders and in fact, other forms of video tape recording equipment or video disc players or other playback machines as well as other forms of the electronic circuits used therewith may be substituted for those illustrated herein. However it should be understood that all such additions and modifications are deemed to be within the scope of the invention which is to be limited only by the claims appended hereto.

I claim:

1. A computer-based video editing system of the type having a master video storage machine and a plurality of video playback machines, each such video playback machine having a duplicate copy of the material transferred from media in the master machine, each such copy, including the original copy in the master machine, haviang a selection of takes, including both picture and sound components of an artistic work such as a dramatic work consisting of the performance of a plurality of lines of dialogue, the system also having a system computer for uniquely designating picture and sound track segments in each take for selection of a sequence of segments of picture and sound track from the available takes of the work; the system comprising:

means for numerically correlating said picture and sound track segments to respective lines of dialogue in the written script of the work being edited, means for selectively switching picture and sound track segments from said playback machines onto blank media in said master machine for generating an edited version of said work, and means for generating a complete data file corresponding to the edited version of said work which may be used for preparation of a final version of said dramatic work in the medium in which it is to be published.

2. The editing system of claim 1 further comprising an audio channel and means connected to the audio channel and the system computer for detecting audio nulls in said sound track for identifying prospective splice points in the dialogue of a work being edited.

3. The editing system of claim 1 further comprising a microprocessor associated with each of said machines for controlling the position, speed and direction of the material in each machine, and said system computer communicating with each said microprocessor for selecting the relative position of playback media on said machines in accordance with editing decisions made by an operator.

4. The editing system of claim 3 further comprising memory means interposed between said host computer and each of said microprocessors, said memory means having means for independent reading and writing therein for expediting the rate of signal transfer between said host computer and said microprocessor.

5. An editing-controllable computer-based system for electronically splicing selected picture and sound track segments of a video recording of an artistic work such as a dramatic work consisting of the performance of a plurality of written lines of dialogue of a script to form an edited version of a recorded work from an operator-selected sequence of such segments; the system comprising:

means in said computer for numerically correlating said picture and sound track segments to respective lines of dialogue in the recorded work, means for selectively switching between various takes of picture and sound track segments for generating an edited video version of said work, and means for generating a computer data file corresponding to the identities of the selected takes of said segments in said edited video version, said data file providing the information to prepare a final version of the artistic work.

6. The editing system of claim 5 further comprising an audio channel and means connected to the audio channel and to said computer for detecting audio nulls in said sound track for identifying prospective splice points in the dialogue of a work being edited.

7. The editing system of claim 5 further comprising a master video source and a plurality of video players, each such player storing a duplicate of a work available from said video source, each of said players and said source being interconnected to a corresponding viewing and listening monitor and to said computer.

8. The editing system of claim 7 further comprising a microprocessor associated with each of said players for controlling the position, speed and direction of the media in each player, and a host computer communicating with each said microprocessor for dictating the relative synchronization of said media.

9. The editing system of claim 8 further comprising memory means interposed between said host computer and each of said microprocessors, said memory means having means for independent reading and writing therein for expediting the rate of signal transfer between said host computer and said microprocessor.

10. An editor-controllable computer-based system for electronically splicing selected picture and sound track segments of a video recording corresponding to respective lines of dialogue in a written script to form an edited version of a recorded work from a selected sequence of such segments; the system comprising:

a system computer, a plurality of video machines for storing said video recording, display means associated with each said video machine for viewing said work, means for automatically detecting splice points in said video recordings, said splice points being regions free of said dialogue between said sound track segments, said computer controlling means for automatically switching between said video machines for generating said selected sequence of said segments, and means for generating a computer data file corresponding to the selected sequence of segments which file may be used for preparation of the final version of said recorded work.

11. The editing system of claim 10 further comprising means in said system computer for numerically correlating said picture and sound track segments to said respective lines of dialogue in the script of the work being edited for identifying said segments.

12. The editing system of claim 11 further comprising a microprocessor associated with each of said machines for controlling the position, speed and direction of the tape in each machine, and said system computer communicating with each said microprocessor for selecting the relative position of playback media on said machines in accordance with editing decisions made by an operator.

13. The editing system of claim 12 further comprising memory means interposed between said host computer and each of said microprocessors, said memory means having means for independent reading and writing therein for expediting the rate of signal transfer between said host computer and said microprocessor.

14. The editing system of claim 10 wherein said means for automatically detecting splice points comprises an audio null detector for identifying substantially silent portions of said sound track.

15. A system for editing a dramatic work by selecting a sequence of picture and sound segments derived from a plurality of takes of a scene of the work corresponding to a written script having a plurality of lines of dialogue, the system comprising:

a plurality of picture and sound segment storage devices each receiving at least a different one of said takes, means for correlating each line of dialogue in the script of said work with a corresponding picture and sound segment in each take of the work, means for playing a selected line-correlated picture and sound segment of each take on a respective video monitor and audio system whereby to permit simultaneous presentations of all related picture and sound segments of the available takes of the work to facilitate selection by an operator of a sequence of segments comprising a final edited version, and means for generating a data file of sequential picture and sound segments selected from the available takes of the work providing a permanent computer record of said final edited version.

16. The system of claim 15 further comprising means connected to said correlating means for electronically detecting where one picture and sound segment ends and another picture and sound segment begins.

17. The system of claim 16 further comprising a computer associated with each of said storage devices for controlling the output of each device into a video display and a system computer for controlling said storage device computer in accordance with selections made by said editor.

* * * * *

REEXAMINATION CERTIFICATE (1930th)
United States Patent [19]
Ettlinger

[11] B1 4,746,994
[45] Certificate Issued Feb. 23, 1993

[54] COMPUTER-BASED VIDEO EDITING SYSTEM

[75] Inventor: Adrian B. Ettlinger, Hastings-on-Hudson, N.Y.

[73] Assignee: Cinedco, Inc., Glendale, Calif.

Reexamination Request:
No. 90/002,183, Oct. 29, 1990

Reexamination Certificate for:
Patent No.: 4,746,994
Issued: May 24, 1988
Appl. No.: 768,491
Filed: Aug. 22, 1985

[51] Int. Cl.⁵ .......................................... H04N 5/782
[52] U.S. Cl. ..................................... 360/13; 360/14.1
[58] Field of Search ................................ 360/13, 14.1

[56] References Cited
U.S. PATENT DOCUMENTS 3,364,306 1/1986 Brown.
3,921,132 11/1975 Baldwin.
4,161,001 7/1979 Sakamota.
4,224,644 9/1980 Lewis et al.
4,249,218 2/1981 Davis et al.
4,272,790 6/1981 Bates.
4,428,001 1/1984 Yamamura et al.
4,516,166 5/1985 Tellone.
4,538,188 8/1985 Barker et al.

OTHER PUBLICATIONS

On Location, The Film and Video Tape Production Magazine (Jun. 1984) pp. 164, 165 "Editing the Montage Way".

Primary Examiner—Thomas Heckler

[57] ABSTRACT

A video-taped-based editing system comprising a computer-based operator's console having a light pen control monitor, floppy disk drives, video/audio switcher, color picture TV monitors with loud speakers and a Z80-based computer employing an STD bus. The system also comprises a plurality of video cassette player/recorders, preferably in the range of six to twelve of such player/recorders with associated computer/machine interface and an additional high quality master video player/recorder preferably of a ¾ inch format. The system provides a graphically arranged representation of the lined script of the work being edited on the light pen control monitor permitting the editor to preview and select segments of different takes for splicing with complete independence of picture and sound track sources and timing. The editing process is a dynamic one in which changes and adjustments are executed while watching repeated replays of a scene or segment. The system gives the editor the ability to work with a unit of material equivalent to approximately fifteen pages of script typing corresponding to one act of a television show or one reel of a theatrical feature film.

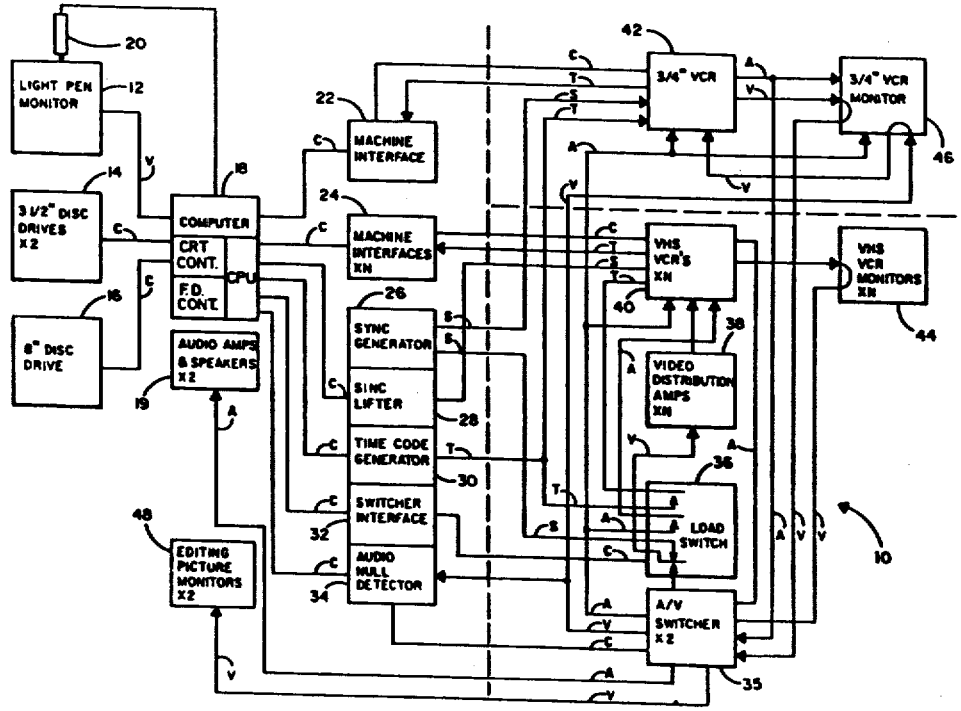

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–17 is confirmed.

* * * * *